US012559911B2

(12) United States Patent
Wang et al.

(10) Patent No.: US 12,559,911 B2
(45) Date of Patent: Feb. 24, 2026

(54) FLOW DISTRIBUTION CONTROL METHOD, DEVICE, AND APPARATUS FOR HYDRAULIC SYSTEM AND HYDRAULIC SYSTEM

(71) Applicant: Zoomlion Heavy Industry Science and Technology Co. Ltd., Changsha (CN)

(72) Inventors: Wei Wang, Changsha (CN); Ling Fu, Changsha (CN); Ye Yuan, Changsha (CN); Junhua Zhang, Changsha (CN); Yanbin Liu, Changsha (CN); Li Yin, Changsha (CN); Lingjuan She, Changsha (CN)

(73) Assignee: ZOOMLION HEAVY INDUSTRY SCIENCE AND TECHNOLOGY CO., LTD., Changsha (CN)

( * ) Notice: Subject to any disclaimer, the term of this patent is extended or adjusted under 35 U.S.C. 154(b) by 136 days.

(21) Appl. No.: 18/552,080

(22) PCT Filed: Mar. 23, 2022

(86) PCT No.: PCT/CN2022/082482
§ 371 (c)(1),
(2) Date: Nov. 3, 2023

(87) PCT Pub. No.: WO2022/199609
PCT Pub. Date: Sep. 29, 2022

(65) Prior Publication Data

US 2024/0200582 A1 Jun. 20, 2024

(30) Foreign Application Priority Data

Mar. 23, 2021 (CN) ......................... 202110309855.2

(51) Int. Cl.
*E02F 9/22* (2006.01)
*F15B 11/042* (2006.01)
(Continued)

(52) U.S. Cl.
CPC .......... *E02F 9/2239* (2013.01); *E02F 9/2225* (2013.01); *E02F 9/2228* (2013.01);
(Continued)

(58) Field of Classification Search
CPC ..... E02F 9/2225; E02F 9/2228; E02F 9/2239; E02F 9/2242; F15B 11/0426; F15B 11/163; F15B 11/17
See application file for complete search history.

(56) References Cited

U.S. PATENT DOCUMENTS 7,434,393 B2 10/2008 Hesse
11,118,328 B2 * 9/2021 Shimizu ................ E02F 9/2242
(Continued)

FOREIGN PATENT DOCUMENTS

CN 101858368 A 10/2010
CN 102483076 A 5/2012
(Continued)

OTHER PUBLICATIONS

Du, Jia, et al., "Energy efficiency characteristics analysis for crane hydraulic system of pump-valve coordinated composite control," Journal of Central South University (Science and Technology), vol. 52, No. 2, Feb. 2021. 2021, 11 pgs.
(Continued)

*Primary Examiner* — Matthew Wiblin
(74) *Attorney, Agent, or Firm* — Volpe Koenig

(57) ABSTRACT

A flow distribution control method for a hydraulic system, the hydraulic system comprising N loops L1-LN. The flow distribution control method comprises the following steps: S1: comparing pressures P1-PN at an inlet of an actuator in each loop of the hydraulic system; S2: according to the comparison result, determining a loop Lp1 which requires flow compensation; and S3: conducting flow compensation on the loop Lp1 according to the theoretical flow of the loop
(Continued)

Lp1 and an actual flow in the loop Lp1 which flows into the actuator, wherein the number of loops in the loop Lp1 is less than or equal to N. Also disclosed are a flow distribution control device and a flow distribution control apparatus for the hydraulic system, the hydraulic system and a non-transitory computer-readable medium. An electric control pressure pump and a flow supplementing valve are employed to replace a constant pressure difference valve, and the flow of all branches may be supplemented, thereby avoiding the phenomenon of unequal flow distribution being generated due to flow distribution characteristics of a pressure compensation system being affected by the overflow area of the constant pressure difference valve. The foregoing employs a flow compensation scheme, has a simple structure, is insensitive to pollution, and has low investment costs.

6 Claims, 11 Drawing Sheets

(51) Int. Cl.
*F15B 11/16* (2006.01)
*F15B 11/17* (2006.01)

(52) U.S. Cl.
CPC ........ *E02F 9/2242* (2013.01); *F15B 11/0426* (2013.01); *F15B 11/163* (2013.01); *F15B 11/17* (2013.01)

(56) References Cited

U.S. PATENT DOCUMENTS

| | | | | |
|---|---|---|---|---|
| 11,434,936 | B2 * | 9/2022 | Ziemens | F15B 11/163 |
| 2021/0048118 | A1 | 2/2021 | Lampton | |

FOREIGN PATENT DOCUMENTS

| | | | | |
|---|---|---|---|---|
| CN | 102734246 | A | 10/2012 | |
| CN | 202659605 | A | 1/2013 | |
| CN | 103109094 | A | 5/2013 | |
| CN | 103573731 | A | 2/2014 | |
| CN | 105443471 | A | 3/2016 | |
| CN | 207598616 | U | 7/2018 | |
| CN | 111577687 | A | 8/2020 | |
| CN | 112064714 | A | 12/2020 | |
| CN | 113027847 | A | 6/2021 | |
| CN | 215257058 | U | 12/2021 | |
| CN | 215257059 | A | 12/2021 | |
| DE | 102008008102 | A1 * | 8/2009 | F15B 11/163 |
| DE | 202009013507 | U1 | 2/2010 | |
| DE | 102013002814 | A1 * | 8/2013 | B66C 13/20 |
| EP | 1664551 | B1 | 4/2008 | |
| JP | 2013-079552 | A | 5/2013 | |
| WO | WO-2018179863 | A1 * | 10/2018 | E02F 9/20 |

OTHER PUBLICATIONS

Extended European Search Report dated Feb. 19, 2025 for European Patent Application No. 22774265.7.

* cited by examiner

FLOW DISTRIBUTION CONTROL METHOD, DEVICE, AND APPARATUS FOR HYDRAULIC SYSTEM AND HYDRAULIC SYSTEM

CROSS REFERENCE TO RELATED APPLICATIONS

This application claims benefits of Chinese Patent Application No. 202110309855.2, filed on Mar. 23, 2021, the contents of which are incorporated herein by reference.

FIELD OF THE INVENTION

This application relates to the field of flow control of a hydraulic system, in particular to a flow distribution control method, device and apparatus for a hydraulic system, a hydraulic flow control system, the hydraulic system and a non-transitory computer-readable medium.

BACKGROUND OF THE INVENTION

In existing flow control of a hydraulic system, a before-valve or after-valve load sensing system is mainly used, redundant pressures are consumed by means of a constant pressure difference valve so as to guarantee that a pressure difference between an inlet and an outlet of a main valve spool is constant, flow distribution is in direct proportion only to an overflow area of two main valve spool. However, unfavorable influence such as poor synchronous coordination of running of different mechanisms and large impact during fast movement, for example, an excavator is out of coordination during operating, discontinuous in action and large in system impact, may be caused by factors of unreasonable design of a compensation valve or a bad matching characteristic between the compensation valve and a load.

When loads of the two main valve (the two loads may be loads between different execution mechanisms, such as loads of a motion arm and a bucket rod of the excavator, or loads of varying amplitude and lifting of a crane) are inconsistent, a flow distribution mode in the prior art mainly depends on the constant pressure difference valve for consuming redundant pressures, and it is guaranteed that the pressure difference between the inlet and the outlet of the main valve spool is constant, and flow distribution is in direct proportion only to the overflow area of the two main valve spool.

The two main valves may refer to a valve which controls flows or (and) directions of the above two loads, or may be two independent valves, or may be two of a multi-way valve, which may be a common flow valve (such as a throttle valve) or an electric proportional directional flow control valve. Theoretically, a flow of each channel neither changes with change of a load pressure of this channel, nor is affected by a flow of another channel. Actually, whether a design of the overflow area of a valve spool of the constant pressure difference valve is reasonable greatly affects the flow distribution characteristic.

Information disclosed in the above background part is only used for further understanding the background of this application, so the information may include information which is known to those ordinarily skilled in the art and does not constitute the prior art.

SUMMARY OF THE INVENTION

This application provides a flow distribution control method, device and apparatus for a hydraulic system. An electric control pressure pump and a flow supplementing valve are employed to replace a constant pressure difference valve, and flows of all branches may be supplemented, thereby avoiding a phenomenon of non-uniform flow distribution which occurs due to a flow distribution characteristic of a pressure compensation system being affected by an overflow area of the constant pressure difference valve. A solution provided by this application is a system for flow distribution by using an open liquid resistance loop, employs a flow compensation scheme, has a simple structure, is insensitive to pollution, and has low investment costs.

Therefore, one aspect of this application provides a flow distribution control method for a hydraulic system, another aspect provides a flow distribution control device for the hydraulic system, yet another aspect provides a flow distribution control apparatus for the hydraulic system, and yet another aspect provides a non-transitory computer-readable medium, and yet another aspect provides the hydraulic system.

A first aspect of this application provides a flow distribution control method for a hydraulic system. The hydraulic system includes N loops L1-LN. The method includes: S1, comparing pressures P1-PN at an inlet of an actuator in each loop of the hydraulic system; S2, according to a comparison result, determining a loop Lp1 which requires flow compensation; and S3, conducting flow compensation on the loop Lp1 according to a theoretical flow of the loop Lp1 and an actual flow in the loop Lp1 which flows into the actuator, wherein the number of loops in the loop Lp1 is less than or equal to N.

A second aspect of this application provides a flow distribution control device for a hydraulic system. The hydraulic system includes N loops L1-LN. The control device includes: a comparing module, configured to compare pressures P1-PN at an inlet of an actuator in each loop of the hydraulic system; a determining module, configured to, according to a comparison result, determine a loop Lp1 which requires flow compensation; and a flow compensation module, configured to conduct flow compensation on the loop Lp1 according to a theoretical flow of the loop Lp1 and an actual flow in the loop Lp1 which flows into the actuator, wherein the number of loops in the loop Lp1 is less than or equal to N.

A third aspect of this application provides a flow distribution control apparatus for a hydraulic system, the hydraulic system includes N loops L1-LN, the apparatus includes one or more processors and a non-transitory computer-readable storage medium storing program instructions, and the one or more processors are configured to, when executing the program instructions, implement the flow control method of this application.

A fourth aspect of this application provides a non-transitory computer-readable storage medium, storing program instructions, and one or more processors being configured to, when executing the program instructions, implement the flow control method of this application.

A fifth aspect of this application provides a hydraulic system, including: a pump for providing a flow for the system; and N loops L1-LN, wherein each loop includes an actuator and a flow regulation element connected with the actuator, and the flow regulation element is configured to provide a flow for the actuator. The hydraulic system further includes a controller, the controller is connected with the pump and the flow regulation element, and the controller is configured to: compare pressures P1-PN at an inlet of an actuator in each loop of the hydraulic system; according to a comparison result, determine a loop Lp1 which requires flow compensation; and conduct flow compensation on the loop Lp1 according to a theoretical flow of the loop Lp1 and an actual flow in the loop Lp1 which flows into the actuator, wherein the number of loops in the loop Lp1 is less than or equal to N.

Compared with the prior art, this application has the beneficial effects:

(1) compared with a load sensing flow distribution system, by using the solution of this application, the flow distribution system of this application has no pressure compensating valve, and a flow distribution characteristic is good, which is not affected by the pressure compensating valve. Besides, this application can achieve flow compensation through an electric control pump, a flow supplementing valve (or an auxiliary valve) and the control method thereof and break through a limit of constant pressure compensating before and after a valve required by a conventional load sensing system.

(2) In the solution of this application, the throttle valve and the flow supplementing valve are of a parallel structure, two proportional throttle valves are connected in parallel, high in universality and compact in structure, and when a main throttle valve goes wrong, the flow supplementing valve may be used as a standby valve.

(3) The electric control pressure pump in the solution of this application may conveniently make a pressure of an outlet of the pump higher than a load by a fixed value all the time through program setting, and compared with a conventional load sensing pump, the electric control pressure pump saves more energy, and is higher in response speed and easy to electrically control.

(4) In the solution of this application, an arithmetical operation is performed on data tested by an electromagnetic proportional throttle valve, a distribution characteristic of the system flow is improved through an electric control system, and both the flow distribution characteristic and an automation degree are higher than those of the conventional load sensing system.

(5) In the solution of this application, the main valve and the auxiliary valve are of the parallel structure, the two electro-hydraulic proportional valves are connected in parallel, high in universality and compact in structure, and when the main valve goes wrong, the auxiliary valve may be used as the standby valve.

BRIEF DESCRIPTION OF DRAWINGS

In order to more clearly describe technical solutions of this application, accompanying drawings needed in the description of embodiments will be briefly introduced below. Apparently, the accompanying drawings in the following description are only some embodiments of this application. Those ordinarily skilled in the art may also obtain other accompanying drawings according to these accompanying drawings without making creative efforts.

DETAILED DESCRIPTION OF THE EMBODIMENTS

Figure 1:
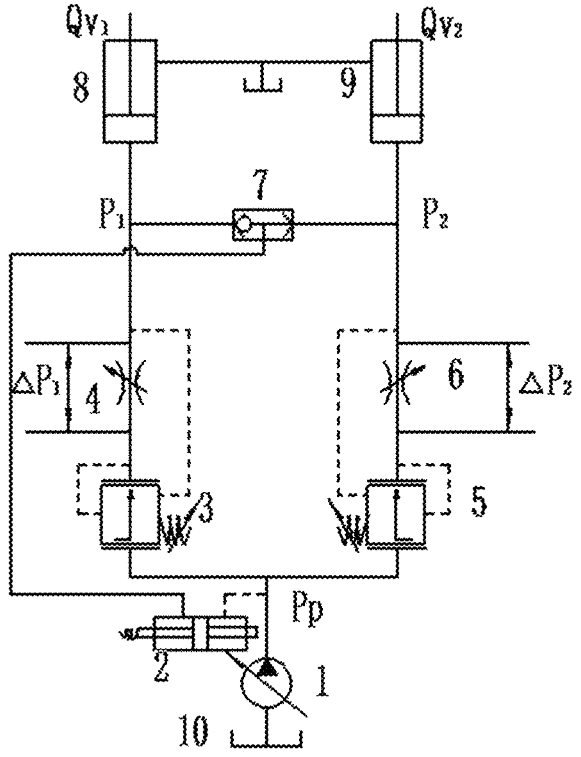
Fig. 1 PRIOR ART
FIG. 1 is a principle diagram of a before-valve compensation system in the prior art according to this application.

Words such as "first" and "second" used herein may be used for describing elements in exemplary embodiments of this application. These words are only used for distinguishing one element from another one, and inherent features or sequences of corresponding elements are not limited by the words. Unless otherwise defined, meanings of all terms (including technical or scientific terms) used herein are the same as usually understood by those ordinarily skilled in the art to which this application belongs. Those terms defined in a common dictionary are construed as having the same meanings as in the context in the related art but not construed as having ideal or too formal meanings unless those terms are clearly defined as having such meanings in this application.

Those skilled in the art will understand that an apparatus and method of this application described herein and illustrated in the accompanying drawings are non-limiting exemplary embodiments, and the scope of this application is defined only by the claims. A feature described or explained with reference to one exemplary embodiment may be combined with a feature of another embodiment. Such modification and variation fall within the scope of this application.

The exemplary embodiments in this application will be described in detail below with reference to the accompanying drawings. In the accompanying drawings, detailed description of related known functions or configurations are omitted so as to avoid unnecessarily overwhelming technical key points of this application. Besides, in the overall description, the same reference numerals represent the same circuit, module or unit all the time, and for conciseness, repeated description of the same circuit, module or unit is omitted.

Besides, it is to be understood that one or more following methods or aspects thereof may be executed by at least one control system, control unit or controller. A term such as "control unit", "controller", "control module" or "main control module" may represent a hardware device including a memory and a processor, and a term "hydraulic system" may similarly represent an apparatus, device or system including a hydraulic control function or a hydraulic device. The memory or a computer-readable storage medium is configured to store program instructions, and the processor is specifically configured to execute the program instructions so as to execute one or more procedures which are to be further described below. Moreover, it is to be understood that the following method may be executed through a processor in combination with one or more other components as realized by those ordinarily skilled in the art.

In the description of this application, it needs to be noted that unless otherwise specified and limited clearly, terms "mount", "arrange" and "connect" are to be understood in a broad sense, for example, it may be a fixed connection, a detachable connection, or an integrated connection; or it may be a direct connection, an indirect connection through an intermediate medium, communication between insides of two elements, or an interaction relationship between the two elements. Specific meanings of the above terms in this application may be understood by those ordinarily skilled in the art according to specific conditions.

First, it is to be noted that the solutions involved in this application belong to the hydraulic field, a substantive technical concept lies in a hydraulic connection relationship for those skilled in the art, and those skilled in the art may also simply replace an oil way or a valve, etc. after knowing the technical concept of this application, so as to implement functions of this application, which also belongs to the protection scope of this application. Related hydraulic elements, such as a reversing valve, a throttle valve, a sensor, a variable displacement pump, a shuttle valve and a proportional valve, are well known to those skilled in the art and are also common components in an existing hydraulic system, so these hydraulic elements are described simply below, and the description focuses on an inventive connection relationship of the solutions of this application.

A flow distribution control system and a control method of this application may be applied to the field of engineering machinery (such as working conditions of flat ground and loading of an excavator), or a working condition of combined actions of varying amplitude and lifting of a crane. But it is not limited to these working conditions, and this application is applicable as long as a working condition of combined actions between two or multiple loads are involved. The multiple loads in the present disclosure may be mechanisms such as a motion arm, a bucket rod, a digging bucket and the like of the excavator and may be understood as a mechanical structure; an actuator or an execution mechanisms in the hydraulic system may be hydraulic oil or a hydraulic motor, and the actuator converts hydraulic energy to mechanical energy; and each loop in the flow distribution control system refers to a hydraulic loop which implements work (functions of reversing, speed regulation and the like) of one actuator (or executor), and one hydraulic loop controls one load.

FIG. 1 is a principle diagram of a before-valve compensation system in the prior art according to this application.

As shown in FIG. 1, a reference numeral and a meaning of each element in FIG. 1 are: variable displacement pump 1, pump variable displacement mechanism 2, pressure compensating valve 3 and 5, adjustable throttle valve 4 and 6, shuttle valve 7, single piston hydraulic cylinder 8 and 9, and oil tank 10.

According to one or more embodiments of this application, functions of the various elements in FIG. 1 are: the variable displacement pump provides a flow for the system; a pressure of a load feedback opening (namely, the shuttle valve 7) is fed back to the pump variable displacement mechanism, and the pump variable displacement mechanism controls a pump swashplate to swing angle so as to control change of a pump displacement; the pressure compensating valves are fixed differential reducing valves so as to guarantee that pressure drop before and after the adjustable throttle valves is a constant value; the single piston hydraulic cylinders are controlled by regulating overflow areas of the adjustable throttle valves; the shuttle valve feeds a maximum pressure (a highest load pressure in the single piston hydraulic cylinders 8 and 9) of the system back to the pump variable displacement mechanism; as for a flow change (namely, a speed change) of the single piston hydraulic cylinders, as the pressure drop before and after the adjustable throttle valves is the constant value, flows of the single piston hydraulic cylinders are controlled to be associated only with the overflow areas of the adjustable throttle valves; and hydraulic oil is put in the oil tank 10.

Figure 2:
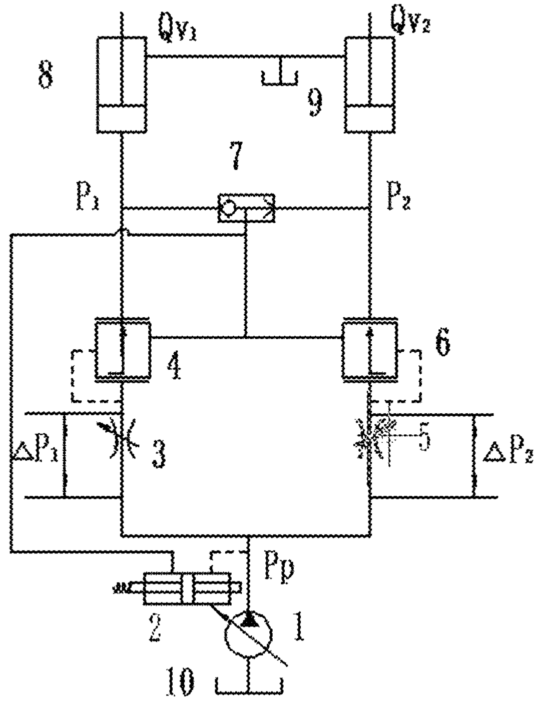
Fig. 2 PRIOR ART
FIG. 2 is a principle diagram of an after-valve compensation system in the prior art according to this application.

FIG. 2 is a principle diagram of an after-valve compensation system in the prior art according to this application.

As shown in FIG. 2, a reference numeral and a meaning of each element in FIG. 2 are: variable displacement pump 1, pump variable displacement mechanism 2, adjustable throttle valve 3 and 5, pressure compensating valve 4 and 6, shuttle valve 7, single piston hydraulic cylinder 8 and 9, and oil tank 10.

According to one or more embodiments of this application, functions of the various elements in FIG. 2 are: the variable displacement pump provides the flow for the system; a pressure of the load feedback opening (namely, the shuttle valve 7) is fed back to the pump variable displacement mechanism, and the pump variable displacement mechanism controls the pump swashplate to swing angle so as to control change of the pump displacement; the pressure compensating valves of the single piston hydraulic cylinders are controlled by regulating the overflow areas of the adjustable throttle valves; the pressure compensating valves use the same pressure (namely, a higher pressure in pressures P1 or P2 of an output opening of the shuttle valve 7) as a control pressure for controlling a pressure (namely, pressures of outlets of the adjustable throttle valves 3 and 5) of an outlet of a flow sensing opening, pump outlet pressures are the same (namely, pressures of inlets of the adjustable throttle valves 3 and 5 are the same), pressure drops of two sides of the inlets and the outlets of the adjustable throttle valves 3 and 5 are the same all the time, and the loop flows of the single piston hydraulic cylinders are associated only with the overflow areas of the adjustable throttle valves; the shuttle valve feeds a maximum pressure (a highest load pressure in the single piston hydraulic cylinders 8 and 9) of the system back to the pump variable displacement mechanism; as for a flow change (namely, a speed change) of the single piston hydraulic cylinders, as the pressure drop before and after the adjustable throttle valves is the constant value, the flows of the single piston hydraulic cylinders are controlled to be associated only with the overflow areas of the adjustable throttle valves; and the hydraulic oil is put in the oil tank 10.

Before-valve compensation and after-valve compensation are common flow distribution methods in the hydraulic system. Before-valve compensation means that the pressure compensating valves are arranged between an oil pump and the throttle valves (as shown in FIG. 1), and after-valve compensation means that the pressure compensating valves are arranged between the throttle valves and the execution mechanism (as shown in FIG. 2). The two ways substantially make pressure differences of loads at two ends of an oil inlet and an oil outlet of each throttle valve maintain a fixed value through the pressure compensating valve, before-valve compensation does not have a load flow saturation resistant function, and when oil supply of a pump is insufficient, flow distribution of the before-valve compensation system is affected by a load difference and cannot distribute the flow according to a proportion of the overflow areas of the throttle valves. After-valve compensation has a flow saturation resistant function, theoretically, a flow of each channel is neither affected by load pressure change of this channel, nor affected by a flow of another channel, actually, pressure loss may occur when an oil liquid flows through a pipeline and a cavity of the valve, a flow distribution ratio of all the channels is incompletely equivalent to an overflow area ratio of the throttle valves, and a design form of a flow area of a valve spool of each pressure compensating valve greatly affects the flow distribution characteristic.

Therefore, when a conventional load sensing control system in the prior art is used for flow distribution, there are the following defects:

(1) the pressure compensating valves are used for achieving that a pressure difference Δp of two ends of an overflow area of a main valve spool is constant, and the pressure compensating valves themselves need to consume high energy;

(2) the before-valve compensation load sensing system in the prior art does not have the load flow saturation resistant function, and the after-valve compensation load sensing system has the flow saturation resistant function, but a pressure compensator needs to consume high energy when the load difference is large, so the after-valve compensation load sensing system is not suitable for an occasion of the large load difference;

(3) as for the before-valve load sensing control system and the after-valve load sensing control system in the prior art, whether a design of the flow area of the valve spool of each pressure compensating valve is reasonable greatly affects the flow distribution characteristic; and (4) the before-valve load sensing control system and the after-valve load sensing control system in the prior art are substantially two damping holes in a serial structure, poor in universality, high in energy consumption and incompact in structure. As shown in FIG. 1 and FIG. 2, in two damping holes in FIG. 1, one damping hole is the pressure compensating valve 3 (or the pressure compensating valve 5), and the other damping hole is the adjustable throttle valve 4 (or the adjustable throttle valve 6). In two damping holes in FIG. 2, one damping hole is the pressure compensating valve 4 (or the pressure compensating valve 6), and the other damping hole is the adjustable throttle valve 3 (or the adjustable throttle valve 5).

Thus, this application adopts a simple liquid resistance control loop without the constant pressure difference valve, a core concept is to perform active flow compensation on a system with a higher pressure in loads of multiple working plates, so as to prevent a loop speed with a high load pressure from decreasing, mutual interference between a plurality of actuators (or executors) is reduced, and thus coordination of a system with the plurality of actuators during combined actions is achieved.

According to one or more embodiments of this application, it may be known according to a throttle outlet formula (1) that a flow passing through the throttle valves is associated with pressure drop (a pressure drop unit is MPa (or Bar)) before and after the valve and a valve opening throttling area. A conventional flow distribution way is to keep pressure drop of each throttle valve constant, the flow Q passing through each throttle valve is associated only with the valve opening throttling area, and a flow distribution ratio is theoretically supposed to be consistent with a throttling area ratio of each throttle valve.

$$Q = C_d A \sqrt{\frac{2\Delta P}{\rho}} \tag{1}$$

In the formula (1): Cd—an orifice throttling constant;

A—the throttling area under a certain opening of the valve spool (a unit is mm2);

ΔP—pressure drop before and after the valve (a pressure drop unit is MPa (or Bar)); and ρ—oil liquid density, which is a constant value (a unit is kg/m3).

Figure 3:
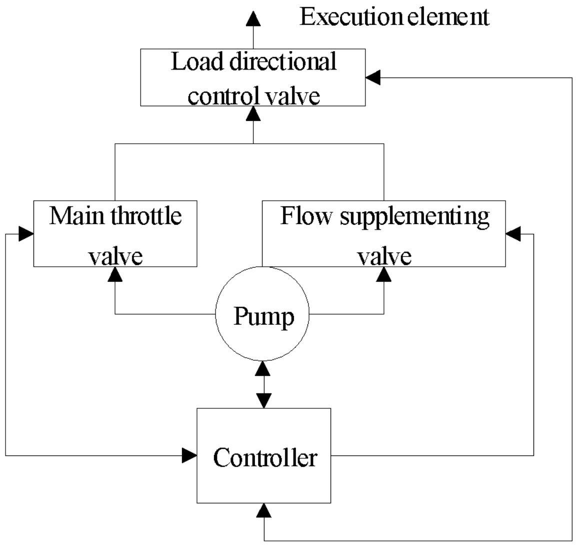
FIG. 3 is a block diagram of a flow distribution control system according to an exemplary embodiment of this application.

FIG. 3 is a block diagram of a flow distribution control system according to an exemplary embodiment of this application. As shown in FIG. 3, the flow distribution control system is mainly composed of a pump (may be the electric control pressure pump), a load directional control valve, the actuator, a flow compensation reversing valve (including the main throttle valve and the flow supplementing valve), the controller and the like.

According to one or more embodiments of this application, the flow compensation reversing valve is a flow regulation element and includes the main throttle valve and the flow supplementing valve. The pump may be a pump system with a plurality of pumps, the plurality of pumps in the pump system are the electric control pressure pump, the variable displacement pump or a constant displacement pump, or various hydraulic pumps are combined according to actual control demands.

According to one or more embodiments of this application, the flow distribution control system shown in FIG. 3 includes: the pump configured to provide the flow for the system, the main throttle valve and the flow supplementing valve. The main throttle valve and the flow supplementing valve are connected with the pump and the actuator and provide the flow for the executor; and the system further includes the controller connected with the pump, the main throttle valve and the flow supplementing valve, and the controller regulates a flow passing through the main throttle valve and the flow supplementing valve according to a control algorithm.

Figure 4:
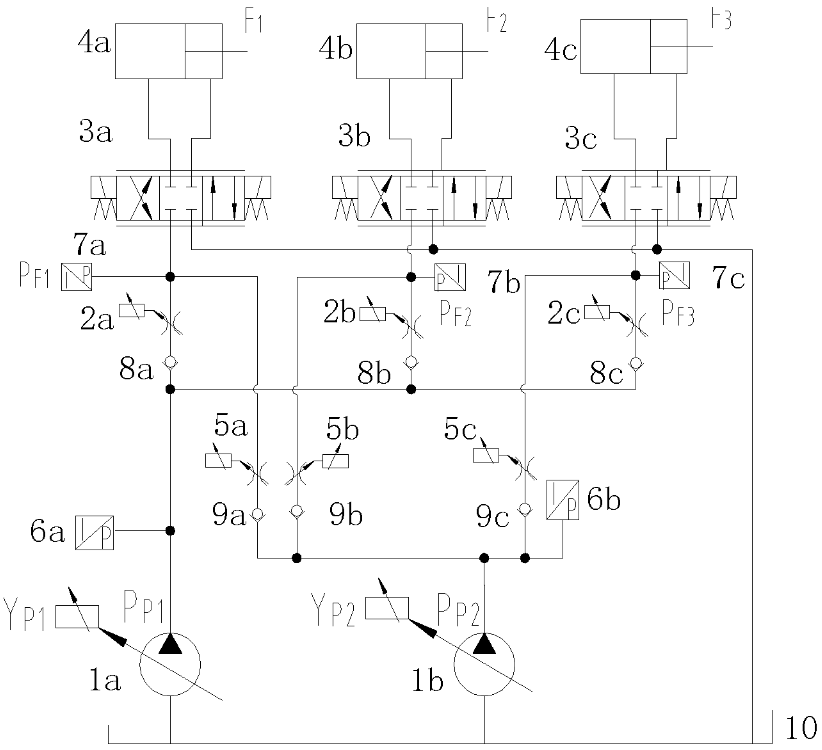
FIG. 4 is a block diagram of implementation of a flow distribution control system according to an exemplary embodiment of this application.

FIG. 4 is a block diagram of implementation of a flow distribution control system according to an exemplary embodiment of this application.

As shown in FIG. 4, elements and reference numerals in FIG. 4 are: electric control pressure pump 1*a* and 1*b;* main throttle valve 2*a,* 2*b* and 2*c;* load directional control valve 3*a,* 3*b* and 3*c*; executor 4*a,* 4*b* and 4*c;* flow supplementing valve 5*a,* 5*b* and 5*c;* pump outlet pressure sensor 6*a* and 6*b;* load pressure sensor 7*a,* 7*b* and 7*c;* one-way valve 8*a,* 8*b* and 8*c;* one-way valve 9*a,* 9*b* and 9*c;* oil tank10; and regulator Yp1 and Yp2.

According to one or more embodiments of this application, functions of main elements in FIG. 4 are:

the electric control pressure pumps

1*a* and 1*b* are the electric control pressure pumps, and through a given input instruction of the electric control pressure pump 1*a*, the electric control pressure pump 1*a* outputs pressure oil PP1 which is higher than a maximum pressure PF max of loads of the multiple working plates by a fixed value ΔP1, namely, a formula (2):

$$P_{P1} - P_{Fmax} = \Delta P_1 \quad (2)$$

The electric control pressure pump 1*b* outputs pressure oil PP2 which is higher than a maximum pressure PF max of loads of the multiple working plates by a fixed value ΔP2, namely, a formula (3):

$$P_{P2} - P_{Fmax} = \Delta P_2 \quad (3)$$

According to demands of working conditions of the hydraulic system, ΔP1 and ΔP2 may be equal or not. A flow distribution relationship between loads of different working plates is associated with three factors such as main pump outlet pressures PP1 and PP2, the main throttle valves 2*a,* 2*b* and 2*c* and the flow supplementing valves 5*a,* 5*b* and 5*c,* and an application occasion and an application range may be greatly widened compared with a conventional throttle loop.

Load Directional Control Valve

The load directional control valves 3*a,* 3*b* and 3*c* only control a movement direction of loads and do not participate in a flow distribution process between loads of the different working plates. Theoretically, the greater an overflow area of each load directional control valves is, the better, and in consideration of an actual installation space and cost, maximum pressure drop of the load directional control valve does not exceed 30 bar.

Main Throttle Valve+Flow Supplementing Valve

The main throttle valves 2*a,* 2*b* and 2*c* are in an electric-hydraulic proportional mode and in flow stepless regulation; and the flow supplementing valves 5*a,* 5*b* and 5*c* are also in an electric-hydraulic proportional mode and in flow stepless regulation. The electric-hydraulic proportional mode is: a flow or a direction of an oil liquid is controlled continuously in proportion according to an inputted electric signal. And the flow stepless regulation is: the flow may be continuously regulated between a minimum value and a maximum value, and a flow value is smooth without steps (as flow change affects a speed of the execution mechanism, it turns out to be stepless regulation of the speed).

When the flow supplementing valves 5*a,* 5*b* and 5*c* do not work (namely, all valve openings are closed, and the overflow areas of the flow supplementing valves are zero), if a pressure PF1 of a load 1 is higher than a pressure PF2 of a load 2, the pressure PF2 of the load 2 is higher than a pressure PF3 of a load 3 (namely, PF1>PF2>PF3), it is assumed that the main throttle valves 2*a,* 2*b* and 2*c* are completely consistent (namely, the overflow areas are completely equal), so a flow flowing into a loop of the load F3 is the largest, a flow flowing into a loop of the load F2 is the second largest, and a flow flowing into a loop of the load F1 is the least, for the reason that in an ordinary throttle loop, the pressure difference of two ends of a loop orifice of the high load is small, and the passing flow is small. At the moment, if the flow supplementing valves 5*a* and 5*b* are controlled to work (namely, openings of the flow supplementing valves open), decreasing flows of the loop of the load 1 and the loop of the load 2 caused by high load pressure may be supplemented respectively by controlling an electric current of the 5*a* and 5*b* to regulate an opening degree of the valve openings, and thus flows of all the loops are equal.

Controller

A flow distribution control algorithm and a control strategy are implemented in the controller, pressures of the electric control pressure pumps 1*a* and 1*b* may be set in the controller, and a theoretical flow 1, a theoretical flow 2, a first loop theory (or assumption) overflow area Aa, a second loop theory (or assumption) overflow area Ab and the like are set. The theoretical flow is given by a hydraulic engineer during designing of the system, which is given according to demands of combined action characteristics of a host machine (such as the crane and the excavator).

According to one or more embodiments of this application, main throttle valves 2*a,* 2*b* and 2*c,* which are in an electric-hydraulic proportional mode and in flow stepless regulation and provide flows for the executors 4*a,* 4*b* and 4*c* together with the flow supplementing valves 5*a,* 5*b* and 5*c,* and open and close states of the 2*a,* 2*b* and 2*c* as well as 5*a,* 5*b* and 5*c* are shown in description of functions of the above throttle valves+flow supplementing valves. 4*a,* 4*b* and 4*c* are the executors: the executors are usually hydraulic motors or hydraulic oil cylinders, such as a motion arm oil cylinder and a rotary motor of the excavator, which are an apparatus for converting hydraulic energy to mechanical energy. Flow supplementing valves 5*a,* 5*b* and 5*c*, which are in an electric-hydraulic proportional mode and in flow stepless regulation and provide flows for the executors 4*a,* 4*b* and 4*c* together with the main throttle valves 2*a,* 2*b* and 2*c,* and open and close states of the 2*a,* 2*b* and 2*c* as well as 5*a,* 5*b* and 5*c* are shown in description of functions of the above throttle valves+flow supplementing valves. 6*a* and 6*b* are pump outlet pressure sensors for detecting the pressure of a pump outlet, 7*a,* 7*b* and 7*c* are load pressure sensors for detecting pressures of load openings, one-way valves 8*a,* 8*b,* 8*c,* 9*a,* 9*b* and 9*c* are one-way conducting valves, the hydraulic oil is put in the oil tank 10, and Yp1 and Yp2 are regulators of the electric control pressure pumps 1*a* and 1*b,* and regulation of the pump pressure and flow is implemented according to an inputted electric signal instruction of the regulators.

Figure 5:
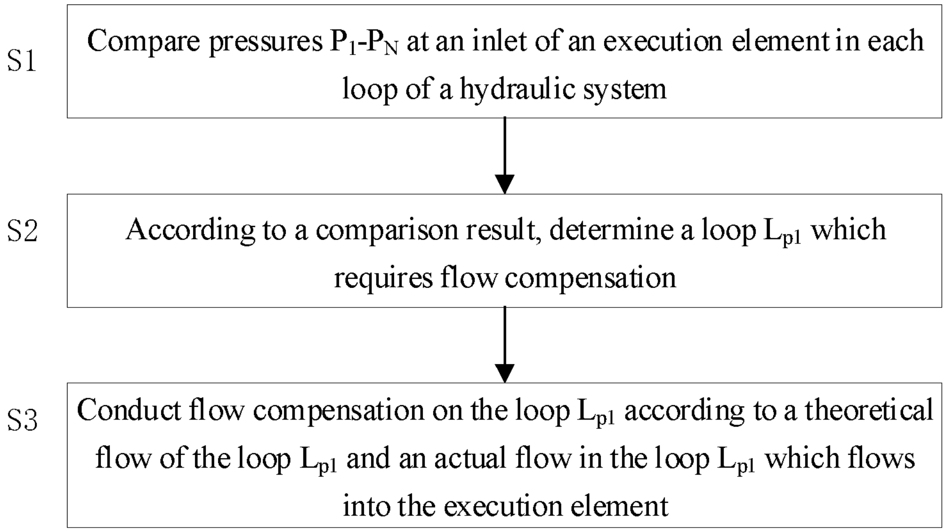
FIG. 5 is a flowchart of flow control of a hydraulic system according to an exemplary embodiment of this application.

FIG. 5 is a flowchart of a flow control method for a hydraulic system according to an exemplary embodiment of this application. The hydraulic system includes a plurality of loops (for example, as shown in FIG. 3, the hydraulic system includes three loops).

As shown in FIG. 5, in step S1, pressures P1-PN at an inlet of an actuator in each loop of the hydraulic system are compared.

In step S2, according to a comparison result, a loop Lp1 which requires flow compensation is determined. According to one or more embodiments of this application, a minimum value P min of the pressures P1-PN at the inlet of the actuator is determined, a loop corresponding to P min is Lp2. The loop Lp1 which requires flow compensation is: another loop in the loops L1-LN except the loop Lp2, the flow supplementing valve connected with the actuator of the loop Lp2 is closed. Wherein, a sum of Lp1 and Lp2 is the total number N of loops, and N is greater than or equal to 2. In the flow distribution system shown in FIG. 4, according to the compared pressure value at the inlet of the actuator, Lp1 is the loop where the load 1 and the load 2 are located, Lp2 is the loop where the load 3 is located, namely, the flow supplementing valves 5*a* and 5*b* need to open, and the flow supplementing valve 5*c* is closed.

In step S3, according to the theoretical flow of the loop Lp1 and the actual flow in the loop Lp1 flowing into the actuator, flow compensation is conducted on the loop Lp1, the number of loops in the loop Lp1 is smaller than or equal to N. And, according to a difference between the theoretical flow of the loop Lp1 and the actual flow in the loop Lp1 flowing into the actuator, by regulating the flow of the flow supplementing valve in the loop Lp1, flow compensation control is conducted on the loop Lp1. When the difference between the theoretical flow of the loop Lp1 and the actual flow in the loop Lp1 flowing into the actuator is smaller than or equal to zero, flow compensation for the loop Lp1 is finished.

Figure 6:
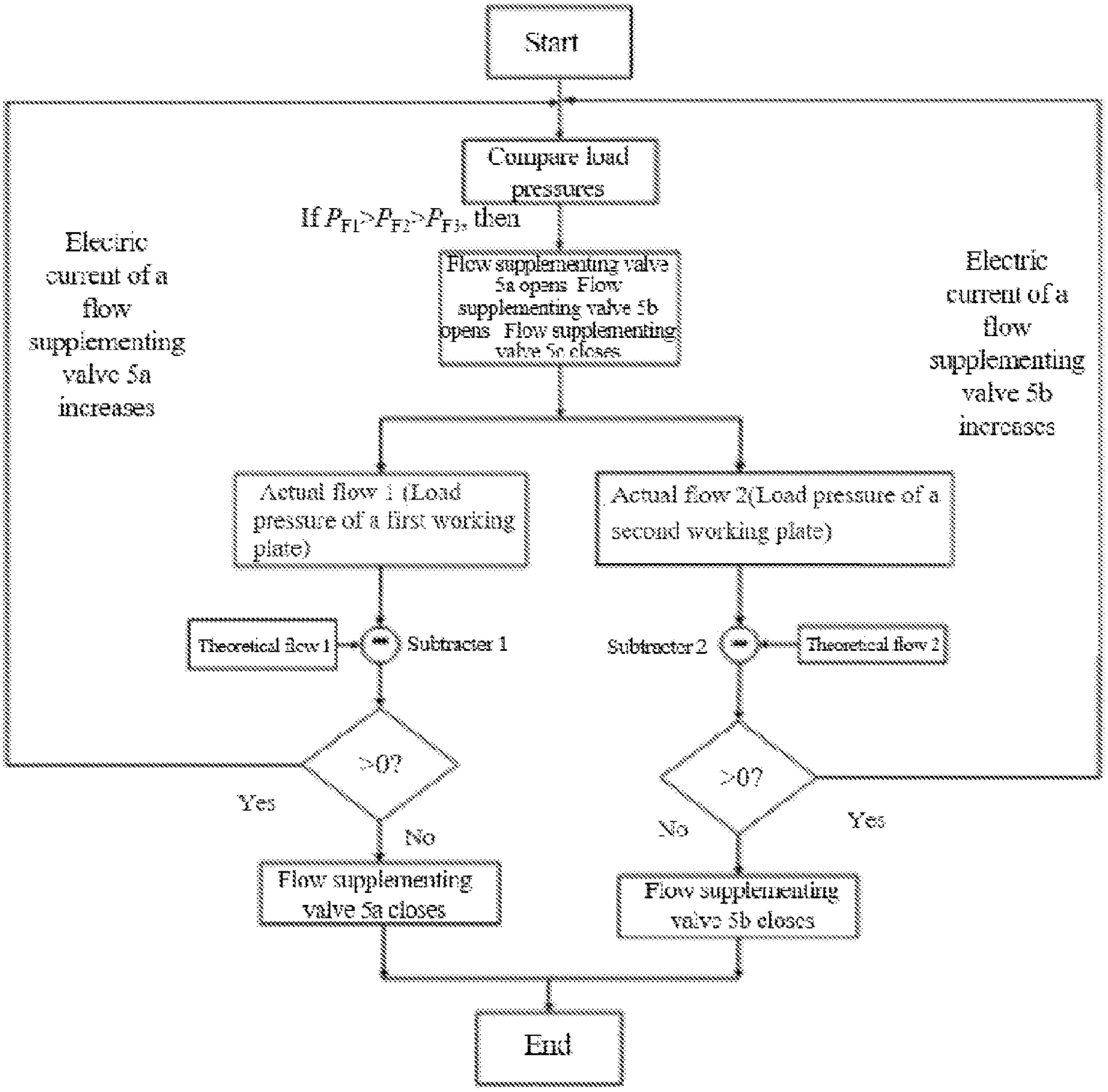
FIG. 6 is a flowchart of specific implementation of a flow control method for a hydraulic system according to an exemplary embodiment of this application.

FIG. 6 is a flowchart of specific implementation of a flow control method for a hydraulic system according to an exemplary embodiment of this application.

As shown in FIG. 6, according to one or more embodiments of this application, the hydraulic system includes three loops (namely, three actuators or executors are included in the three loops, or the hydraulic system includes triple loads).

An actual total flow flowing into a load PF1 of the first working plate: $Q_A'$=Q1+Q1S;

an actual total flow flowing into a load PF2 of the second working plate: $Q_B'$=Q2+Q2S; and an actual total flow flowing into a load PF3 of the third working plate: $Q_C'$=Q3+Q3S.

It is assumed that PF1>PF2>PF3, and specific working procedures of a specific implementation flow of the flow control method for the hydraulic system shown in FIG. 6 are as follows:

1, a pressure signal is collected through a pressure sensor, and magnitudes of the pressures PF1, PF2 and PF3 at the inlet of the actuator are compared;

2, the flow supplementing valve corresponding to the load of the smallest working plate does not open, and the flow supplementing valves corresponding to the other working plate need to open. If PF1>PF2>PF3, both the flow supplementing valves 5*a* and 5*b* need to open, and the flow supplementing valve 5*c* does not need to open;

3, values of the theoretical flow 1 (namely, the theoretical flow of the first loop), and the theoretical flow 2 (namely, the theoretical flow of the second loop) are set. The theoretical flow 1 is associated with the first loop theory (or assumption) overflow area Aa, a difference ΔP1 between the pressure at an outlet of a pump 1*a* and the maximum pressure PF max of loads of the multiple working plates, the oil liquid density ρ, an overflow coefficient Cd and the like, the theoretical overflow area Aa needs to be given according to requirements of working conditions, and for convenient analysis, other parameters (ΔP1, ρ and Cd), once set, may be constant values in default. The theoretical flow 2 is associated with the second loop theory (or assumption) overflow area Ab, a difference ΔP1 between a pump 1*b* and the maximum pressure PF max of loads of the multiple working plates, the oil liquid density ρ, the overflow coefficient Cd and the like, the theoretical overflow area Ab needs to be given according to requirements of working conditions, and for convenient analysis, a plurality of other parameters may be constant values in default;

4, the flow (the actual flow 1) flowing into the load F1 is calculated, a difference between the theoretical flow 1 and the actual flow 1 is a compensation flow 1, and by regulating a magnitude of the electric current of the flow compensating valve 5*a* (namely, controlling the overflow area of the flow compensating valve 5*a*), the flow of the flow compensating valve 5*a* compensates the flow of the loop 1 reduced due to the high load pressure. Likewise, the flow (the actual flow 2) flowing into the load F2 is calculated, and by regulating a magnitude of the electric current of the flow compensating valve 5*b,* the flow of the flow compensating valve 5*b* compensates the flow of the loop 2 reduced due to the high load pressure;

5, whether the compensation flow is zero is judged (namely, whether subtracting the actual flow from the theoretical flow is zero), if it is greater than zero, the step 1 is conducted again (a load pressure comparison stage), if it is smaller than or equal to zero, the corresponding flow supplementing valve is closed, and a flow compensation process is finished, namely a condition of terminating flow compensation control or flow regulation execution is judging whether subtracting the actual flow from the theoretical flow is smaller than or equal to 0; and 6, finally, flow distribution of the loop 1, the loop 2 and the loop 3 meets demands of flow distribution of actual working conditions.

It is assumed that PF1, PF2 and PF3 do not meet PF1>PF2>PF3, it may also refer to the above control method.

According to one or more embodiments of this application, judging the magnitudes of PF1, PF2 and PF3 is a condition of determining which flow supplementing valve is to open. If values of PF1, PF2 and PF3 are the same, the three flow supplementing valves are all closed; if two of them are the same, it is assumed that PF1=PF2 and PF1>PF3, the flow supplementing valves 5*a* and 5*b* need to open; and if two of them are the same, it is assumed that PF1=PF2 and PF1<PF3, only the flow supplementing valve 5*c* needs to open.

Figure 7:
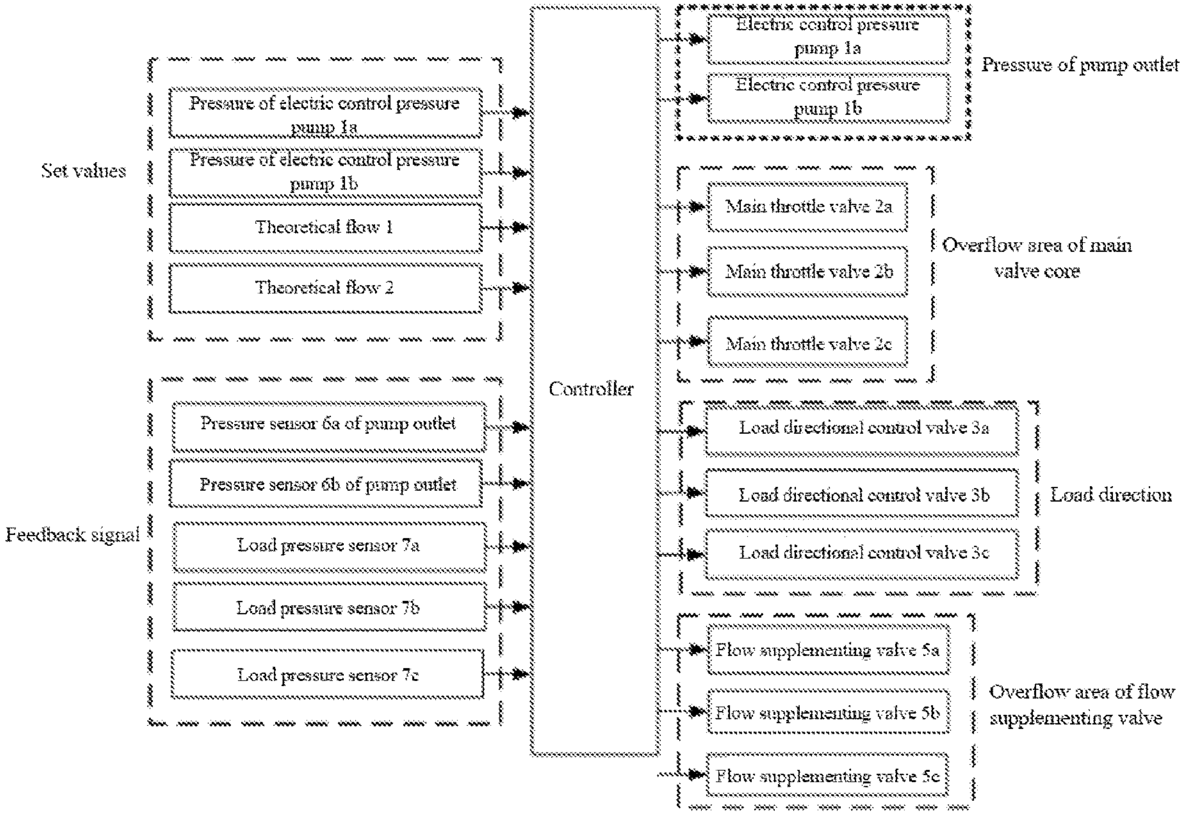
FIG. 7 is a connection diagram of a controller in a hydraulic system according to an exemplary embodiment of this application.

FIG. 7 is a connection diagram of a controller in a hydraulic system according to an exemplary embodiment of this application.

As shown in FIG. 7, set values may be stored in the controller, and the set values include the pressures of the electric control pressure pumps 1*a* and 1*b,* and the theoretical flows (theoretical flows 1 and 2) of each loop in the hydraulic system. The controller may also receive a pressure feedback signal transferred by pump opening pressure sensors (6*a* and 6*b*) and load pressure sensors (7*a,* 7*b* and 7*c*). Besides, the controller may control the pressure of the pump outlet, an area flowing through the main valve spool, a load direction and an area flowing through the flow supplementing valves, specific parameters are shown in FIG. 7. In FIG. 7, a connection relation of the controller is only a specific instance in FIG. 3 to FIG. 5. When a plurality of loops are included in a flow system, the connection relation of the controller may be like this and will not be repeated here.

Figure 8:
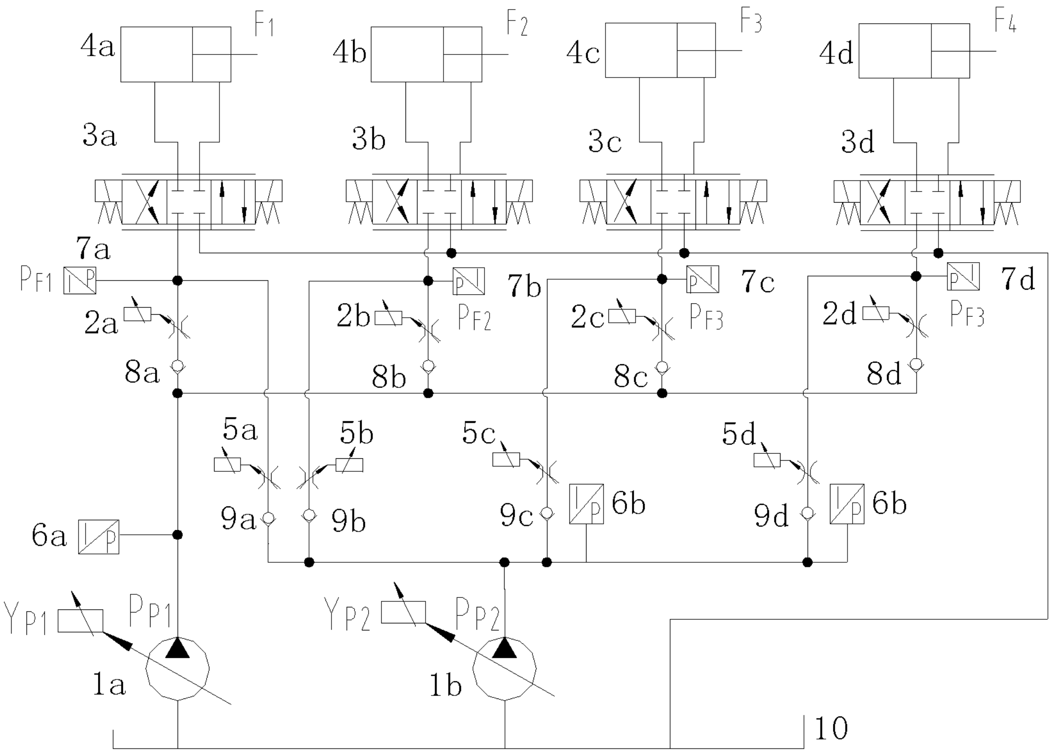
FIG. 8 is a block diagram of a flow distribution control system including quadruple loads according to an exemplary embodiment of this application.

According to one or more embodiments of this application, the flow distribution control system and the control method of this application are also suitable for the quadruple loads besides the two loads and the triple loads (theoretically, the loads may be widened infinitely), and for convenient analysis, the following brief description is made: it is assumed that the loads are widened to the quadruple loads, related components of the hydraulic system may refer to FIG. 8, and the flow control method in FIG. 8 is similar to the triple loads.

According to one or more embodiments of this application, by the control method in FIG. 4 of this application, an adjustment range of the flow is:

(1) as for the triple loads, flow distribution is non-uniform due to the load pressure, flows of at most two loads need to be regulated (theoretically, the flow of loads of the smallest working plate is the largest and does not need to be supplemented), namely, a freedom degree of a triple-load system needs to be regulated as 2; and in this application, the freedom degree needing to be regulated here may be understood as needing to regulate flows of the two loads. The freedom degree is similar to that in a mechanical structure, two coordinates of X and Y (namely, two freedom degrees) are needed if a point of a planar motion moves to any place, and three coordinates of X, Y and Z (namely, three freedom degrees) are needed if a point of a spatial motion moves to any place.

(2) There are two electric control pressure pumps in FIG. 3 of this application, two freedom degrees of $\Delta P_1$ and $\Delta P_2$ in an aspect of a pressure difference may be regulated, and values of $\Delta P_1$ and $\Delta P_2$ may be regulated according to requirements of actual working conditions and energy consumption.

(3) In FIG. 3 of this application, there are three flow supplementing valves of 5*a*, 5*b* and 5*c*, given that at most two ways need to be compensated, at least two freedom degrees may be regulated in an aspect of an overflow area. If there are four supplementing valves, at most three supplementing valves need to open, namely, the freedom degree needs to be regulated as 3, and thus the adjustable freedom degree is 3+2=5; and if the hydraulic system has N supplementing valves, the freedom degree needs to be regulated as N−1, and thus an adjustable freedom degree of the pressure difference and the overflow area is (N−1)+2=N+1.

(4) In the above embodiment of this application, as for the triple loads, the freedom degree needs to be regulated as 2, and the adjustable freedom degree of the pressure difference and the overflow area is 4, which far meets a use requirement of the hydraulic system.

(5) Likewise, as for the quadruple loads, the freedom degree needs to be regulated as 3, the adjustable freedom degree of the actual pressure difference and the overflow area is 5, which also meets a use requirement; and as for the quintuplet loads, the freedom degree needs to be regulated as 4, and the adjustable freedom degree of the actual pressure difference and the overflow area is 6, which meets a user requirement. The loads of the smallest working plates do not need to open the supplementing valve, namely, the freedom degree N−1 needing to be regulated is other working plates except the smallest working plates. The adjustable freedom degree of the actual pressure difference and the overflow area is (N+1).

In FIGS. 3 to 7, symbols used in the embodiments of this application are shown in Table 1 below:

TABLE 1

| Number | Symbol | Meanings | Unit |
|---|---|---|---|
| 1 | Pp1 | Pressure of the outlet of the electric control pressure pumps 1a | MPa |
| 2 | Pp2 | Pressure of the outlet of the electric control pressure pump 1b | MPa |
| 3 | PF | Load pressure | MPa |
| 4 | PF1 | Load pressure of the first working plate | MPa |
| 5 | PF2 | Load pressure of the second working plate | MPa |
| 6 | PF3 | Load pressure of the third working plate | MPa |
| 7 | PFmax | Load Pressure of the highest working plate | MPa |
| 8 | QA | Theoretical total flow of the first working plate | L/min |
| 9 | $Q_A'$ | Actual total flow of the first working plate | L/min |
| 10 | Q1 | An overflow amount of the main throttle valve 2a of the first working plate | L/min |
| 11 | Q1S | An overflow amount of the flow supplementing valve 5a of the first working plate | L/min |
| 12 | QB | Theoretical total flow of the second working plate | L/min |
| 13 | $Q_B'$ | Actual total flow of the second working plate | L/min |
| 14 | Q2 | An overflow amount of the main throttle valve 2b of the second working plate | L/min |
| 15 | Q2S | An overflow amount of the flow supplementing valve 5b of the second working plate | L/min |
| 16 | QC | Theoretical total flow of the third working plate | L/min |
| 17 | $Q_C'$ | Actual total flow of the third working plate | L/min |
| 18 | Q3 | An overflow amount of the main throttle valve 2b of the third working plate | L/min |
| 19 | Q3S | An overflow amount of the flow supplementing valve 5b of the third working plate | L/min |
| 20 | A1 | An overflow area of the valve spool of the main throttle valve of the first working plate | $mm^2$ |
| 21 | A1S | An overflow area of a valve spool of the flow supplementing valve of the first working plate | $mm^2$ |
| 22 | Aa | First loop theory (or assumption) overflow area | $mm^2$ |
| 23 | A2 | An overflow area of the valve spool of the main throttle valve of the second working plate | $mm^2$ |
| 24 | A2S | An overflow area of a valve spool of the flow supplementing valve of the second working plate | $mm^2$ |
| 25 | Ab | Second loop theory (or assumption) overflow area | $mm^2$ |
| 26 | A3 | An overflow area of the valve spool of the main throttle valve of the third working plate | $mm^2$ |
| 27 | A3S | An overflow area of a valve spool of the flow supplementing valve of the third working plate | $mm^2$ |
| 28 | Ac | Third loop theory (or assumption) overflow area | $mm^2$ |
| 29 | $\Delta P_1$ | Value of (PP1 − PFmax) | MPa |
| 30 | $\Delta P_2$ | Value of (PP2 − PFmax) | MPa |
| 31 | Cd | Overflow coefficient of an orifice | Null |

According to one or more embodiments of this application, this application may also adopt electromagnetic proportional valves as a main valve and an auxiliary valve, an overflow area of a valve opening of the main valve may change steplessly. An overflow area of a valve spool of the main valve is controlled by displacing a handle, namely, the main valve meets a load flow demand in an initial state. When the load changes, the auxiliary valve starts to act, a throttle area of a valve spool of the auxiliary valve is controlled through an electric control unit, at the moment, the main valve and the auxiliary valve jointly complete flow supply. This embodiment of this application actually controls a flow of the auxiliary valve according to load change, a load demand is met, and compared with an existing before-valve and after-valve load sensing system, a difference lies in that a pressure difference before and after the main valve spool does not need to keep constant. Flow compensation is implemented through the auxiliary valve and the control method thereof, and then a limit of constant pressure compensating before and after the valve required by the conventional load sensing system is broken through.

Figure 9:
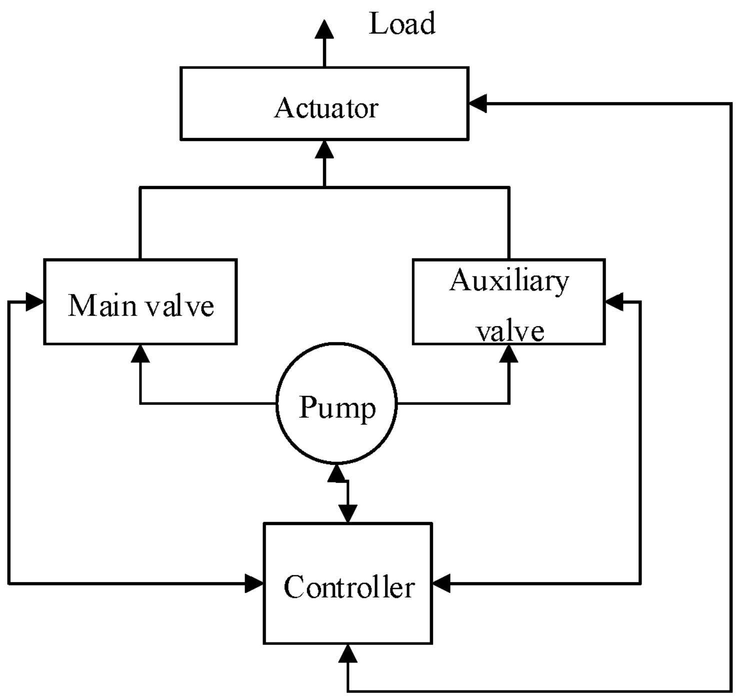
FIG. 9 is a block diagram of another flow distribution control system according to an exemplary embodiment of this application.

FIG. 9 is a block diagram of another flow distribution control system according to an exemplary embodiment of this application. As shown in FIG. 9, the flow distribution control system includes: the pump configured to provide the flow for the system; the main valve and the auxiliary valve, wherein the main valve and the auxiliary valve are connected with the pump and an executor and provide the flow for the executor. The system further includes the controller connected with the pump, the main valve and the auxiliary valve, and the controller controls opening degrees of the valve spools of the main valve and the auxiliary valve according to a control algorithm, so as to regulate an output flow of the executor. The main valve controls movement of the valve spool through an inputted electric signal so as to regulate the flow, and the auxiliary valve is controlled by the controller so as to compensate insufficient flow of the executor.

Figure 10:
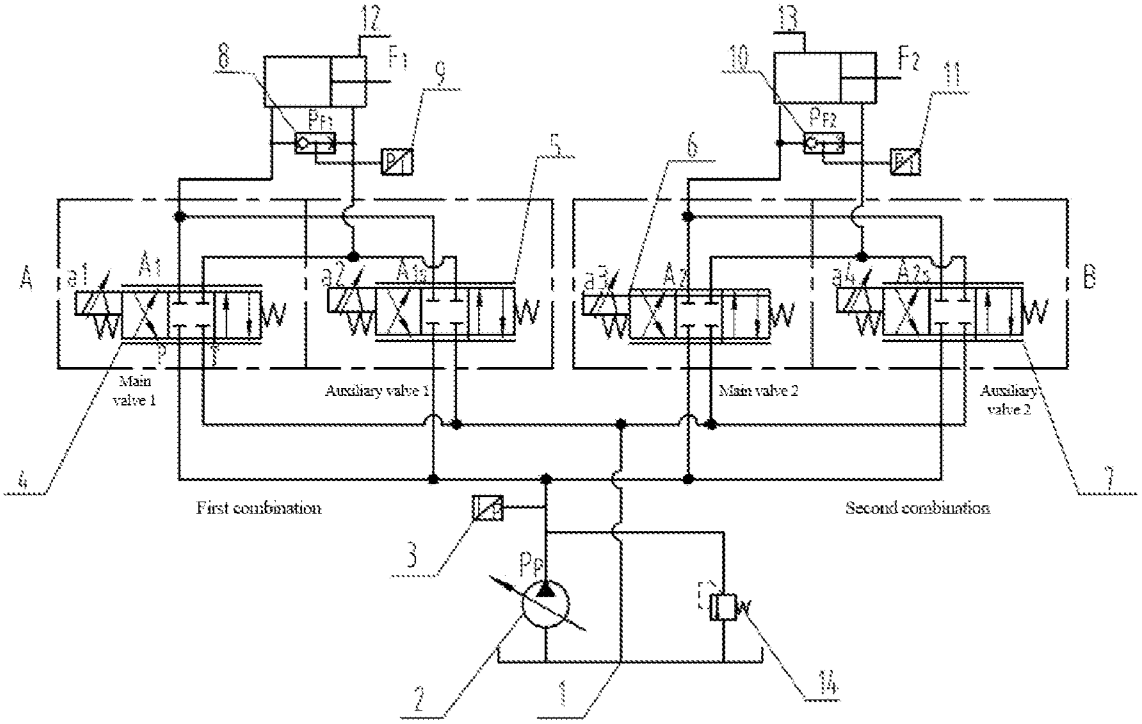
FIG. 10 is a block diagram of implementation of another flow distribution control system according to an exemplary embodiment of this application.

FIG. 10 is a block diagram of implementation of another flow distribution control system according to an exemplary embodiment of this application.

As shown in FIG. 10, the flow distribution control system is mainly composed of the main valve, the auxiliary valve, the shuttle valve, the pressure sensor, a safety valve, the controller and the like.

As shown in FIG. 10, reference numerals in FIG. 10 are: oil tank 1, variable displacement pump 2, pressure sensor 3, 9 and 11, first main valve 4, first auxiliary valve 5, second main valve 6, second auxiliary valve 7, shuttle valve 8 and 10, oil cylinder 12 and 13, safety valve 14, first working plate A, and second working plate B.

As shown in FIG. 10, functions of the various elements in FIG. 10 are: hydraulic oil is put in the oil tank 1; the variable displacement pump 2 outputs pressure oil PP which is higher than the maximum pressure PF max of loads of the multiple working plates by a fixed value; the pressure sensor 3 detects the pressure of the pump outlet, the pressure sensors 9 and 11 detect a pressure of loads of the multiple working plates, a pressure signal measured by the pressure sensors may be processed through a control unit, the processed signal is amplified through an amplifier and then transmitted to a1, a2, a3 and a4, so as to control the opening degrees of the valve spools of the main valve and the auxiliary valve and regulate an input flow of each executor; the main valves 4 and 6 control the valve spools to move in the system through the inputted electric signal; the auxiliary valves 5 and 7 serve as assistance valves of the main valves and may compensate insufficient flow of the execution mechanism; the shuttle valves 8 and 10 obtain a highest load pressure and feed the pressure back to the variable displacement pump 2; the oil cylinders 12 and 13 are executors which are an apparatus for converting the hydraulic energy to the mechanical energy, such as the motion arm oil cylinder and the rotary motor of the excavator; and the safety valve 14 is actually an overflow valve which opens when the maximum pressure of the system reaches a set pressure of the safety valve for safety.

According to one or more embodiments of this application, as shown in FIG. 10, the first main valve and the second main valve are in an electric proportional mode and in flow stepless regulation; and the first auxiliary valve and the second auxiliary valve are also in an electric proportional mode and in flow stepless regulation. The main valves control the valve spools to move in the system through the inputted electric signal; the auxiliary valves serve as the assistance valves of the main valves and may compensate insufficient flow of the execution mechanism; the shuttle valves may obtain the maximum load pressure; the pressure sensors may detect a pressure of an oil way in real time, as shown in FIG. 6, the pressure sensors 9 and 11 are configured to monitor the high load pressure, the pressure sensor 3 is configured to monitor the pressure of the pump outlet, the pressure signal measured by the pressure sensors is fed back to the controller, a flow distribution control algorithm and a control strategy are implemented in the controller, a pressure of the variable displacement pump 2 may be set in the controller, the theoretical flow 1 and the theoretical flow 2 are set, the processed signal is amplified by the amplifier and then transmitted to a1, a2, a3 and a4, and thus the opening degrees of the valve spools of the main valves and the auxiliary valves are controlled and the output flow of each executor is regulated.

Figure 11:
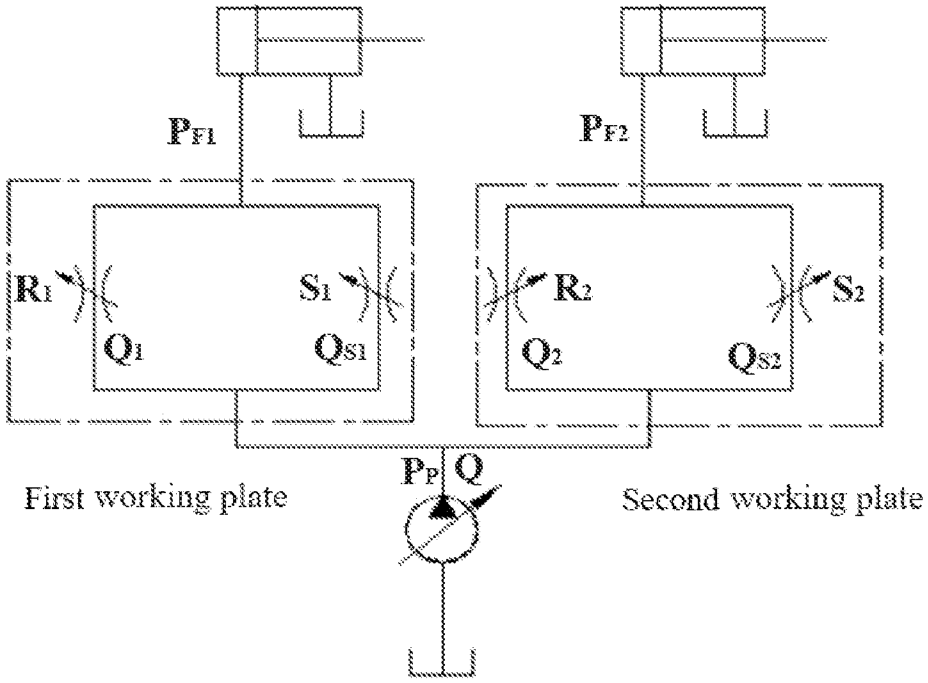
FIG. 11 is a simplified block diagram of another flow distribution control system according to an exemplary embodiment of this application.

FIG. 11 is a simplified block diagram of another flow distribution control system according to an exemplary embodiment of this application.

As shown in FIG. 11, reference numerals in FIG. 11 are: first main valve R1; second main valve R2; first auxiliary valve S1; second auxiliary valve S2; inlet pressure PF1 of a first execution mechanism (an actuator or executor); inlet pressure PF2 of a second execution mechanism (an actuator or executor); flow Q1 of the main valve of the first working plate; flow Q2 of the main valve of the second working plate; flow QS1 of the auxiliary valve of the first working plate; and flow QS2 of the auxiliary valve of the second working plate.

As shown in FIGS. 11, R1 and R2 are main valves, S1 and S2 are auxiliary valves, the main valves and the auxiliary valves are in parallel and jointly supply oil for a certain load, thus the above embodiment of this application is equivalent to increasing an overflow area of a load loop, which is particularly suitable for an occasion with a high-speed control requirement.

Figure 12:
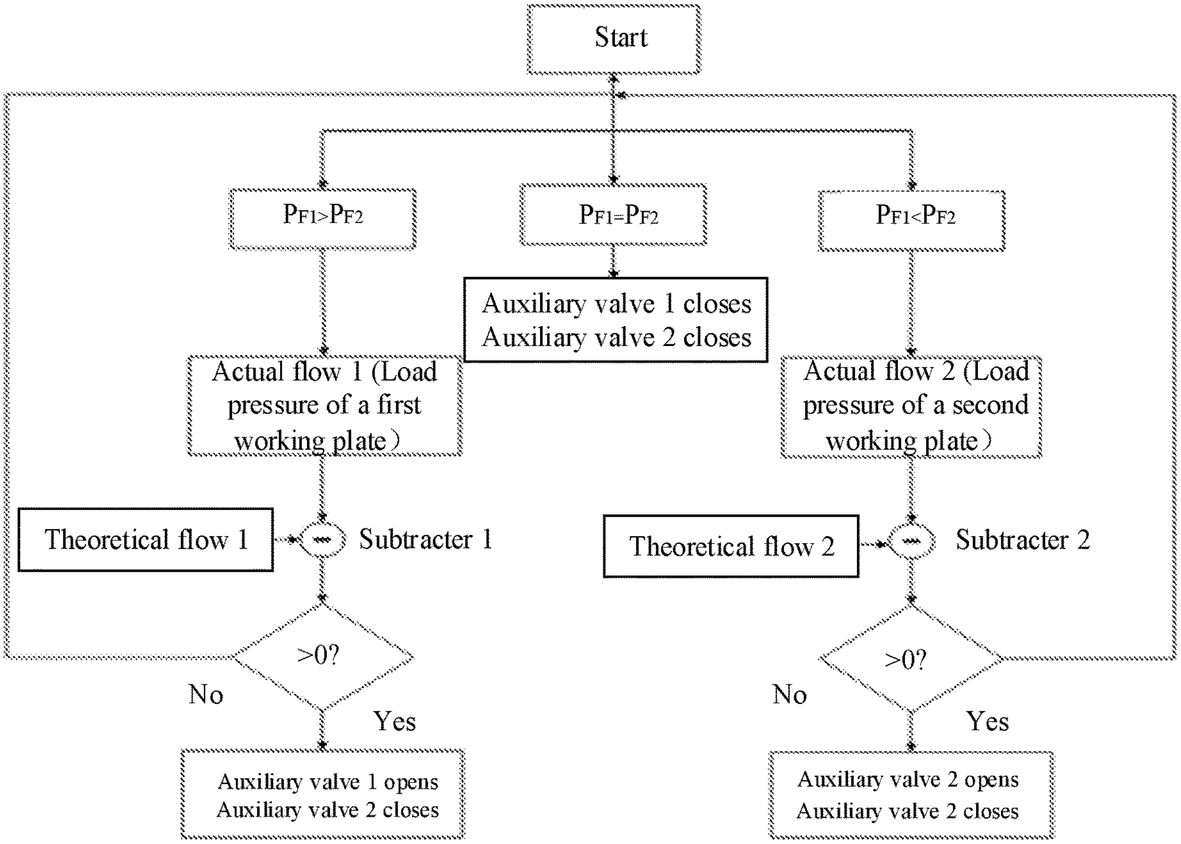
FIG. 12 is a flowchart of specific implementation of a flow control method for another hydraulic system according to an exemplary embodiment of this application.

FIG. 12 is a flowchart of specific implementation of a flow control method for another hydraulic system according to an exemplary embodiment of this application.

As shown in FIG. 12, the hydraulic system includes two loops (namely, two actuators or executors are included in the two loops, and the hydraulic system includes two loads).

Specific working procedures of a specific implementation flow of the flow control method for the hydraulic system shown in FIG. 12 are as follows:

1, magnitudes of the pressures PF1 and PF2 at the inlet of the actuator are compared, a high-pressure loop is selected by the pressure sensors, and thus flow compensation is implemented.

2, As each proportional valve has a corresponding area-displacement relation when designing is finished, a theoretical flow of the main valve of the high-pressure loop may be obtained through the arithmetical operation.

3, According to a difference between PF1 (or PF2) and a pump oil outlet pressure Pp, an actual flow is calculated by using an outlet flow formula, and the calculation formula of the outlet flow is the above formula (1).

4, The difference between the theoretical flow and the actual flow is a compensation flow, and flow compensation may be met by regulating a flow area of an auxiliary electromagnetic proportional reversing valve.

5, Finally, the actual flow is approximately equal to the theoretical flow, the flow distribution demand is met, namely, when the difference between the theoretical flow and the actual flow is smaller than or equal to zero, flow distribution control is finished.

In the flow in FIG. 12, parameter values needing to be calculated are: $\Delta P_1$—a theoretical pressure drop of the valve spool of the first working plate with a unit being bar; $\Delta P_2$—a theoretical pressure drop of the valve spool of the second working plate with a unit being bar; $Q_A$—a total flow of the first working plate, which is equal to $Q_1+Q_{S1}$ with a unit being L/min; $Q_B$—a total flow of the second working plate, which is equal to $Q_2+Q_{S2}$ with a unit being L/min; Cd1—orifice throttling constant of the first main valve spool; and Cd2—orifice throttling constant of the second main valve spool, wherein $\Delta P_1'=P_P-P_{F1}$; $\Delta P_2'=P_P-P_{F2}$.

According to the flow shown in FIG. 12, $\Delta P_1$ (or $\Delta P_1'$) is an actual pressure drop of a load of the first working plate, which is a difference between the detected pump outlet pressure $P_P$ (or $P_{P1}$) and an inlet pressure $P_{F1}$ of the first execution mechanism, and through $\Delta P_1$ (or $\Delta P_1'$) and the formula (1), the actual flow 1 of the first working plate may be calculated; and $\Delta P_2$ (or $\Delta P_2'$) is an actual pressure drop of the load of the second working plate, which is a difference between the detected pump outlet pressure $P_P$ (or $P_{P2}$) and the inlet pressure $P_{F2}$ of the second execution mechanism, and through $\Delta P_2$ (or $\Delta P_2'$) and the formula (1), the actual flow 2 of the second working plate may be calculated.

Figure 13:
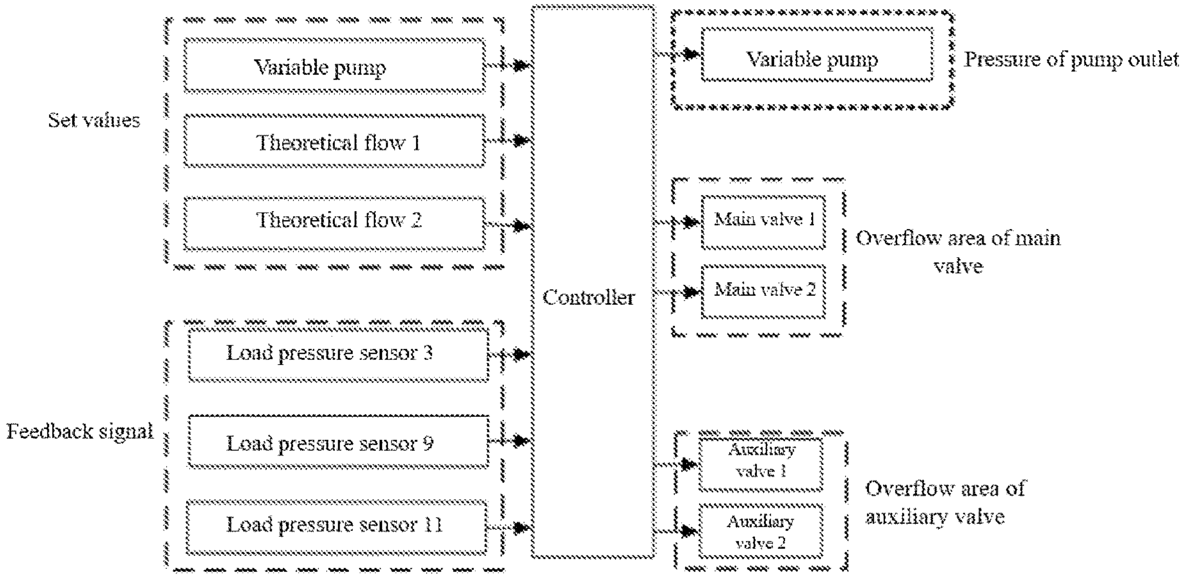
FIG. 13 is a connection diagram of a controller in another hydraulic system according to an exemplary embodiment of this application.

FIG. 13 is a connection diagram of a controller in another hydraulic system according to an exemplary embodiment of this application. As shown in FIG. 13, set values may be stored in the controller, and the set values include pressure values of the pumps, and the theoretical flows (theoretical flows 1 and 2) of each loop in the hydraulic system. The controller may also receive a pressure feedback signal transferred by the load pressure sensors (3, 9 and 11). Besides, the controller may control the pressure of the pump outlet, an area flowing through the main valves and an area flowing through the auxiliary valves, specific parameters are shown in FIG. 13. In FIG. 13, a connection relation of the controller is only a specific instance in FIG. 9 to FIG. 12. When a plurality of loops are included in a flow system, the connection relation of the controller may be like this and will not be repeated here.

In the embodiments illustrated in FIGS. 9 to 12, symbols used in the embodiments of this application are shown in Table 2 below:

TABLE 2

| Number | Symbol | Meanings | Unit |
|---|---|---|---|
| 1 | Pp | Pressure of the pump outlet | MPa |
| 2 | Q | Flow of the pump outlet | L/min |
| 3 | R1 | Main valve of the first working plate | / |
| 4 | S1 | Auxiliary valve (assisting in work of the main valve R1) of the first working plate | / |
| 5 | A1 | An overflow area of the first main valve spool | $mm^2$ |
| 6 | AS1 | An overflow area of the first auxiliary valve spool | $mm^2$ |
| 7 | Q1 | Flow of the main valve of the first working plate | L/min |
| 8 | QS1 | Flow of the auxiliary valve of the first working plate | L/min |
| 9 | QA | Theoretical total flow of the first working plate | L/min |
| 10 | $Q_A'$ | Actual total flow of the first working plate | L/min |
| 11 | R2 | Main valve of the second working plate | / |

TABLE 2-continued

| Number | Symbol | Meanings | Unit |
|---|---|---|---|
| 12 | S2 | Auxiliary valve (assisting in work of the main valve R2) of the second working plate | / |
| 13 | A1 | Overflow area of the second main valve spool | $mm^2$ |
| 14 | AS1 | Overflow area of the second auxiliary valve spool | $mm^2$ |
| 15 | Q2 | Flow of the main valve of the second working plate | L/min |
| 16 | QS2 | Flow of the auxiliary valve of the second working plate | L/min |
| 17 | QB | Theoretical total flow of the second working plate | L/min |
| 18 | $Q_B'$ | Actual total flow of the second working plate | L/min |
| 19 | PF1 | Inlet pressure of the first execution mechanism | MPa |
| 20 | PF2 | Inlet pressure of the second execution mechanism | MPa |

Figure 14:
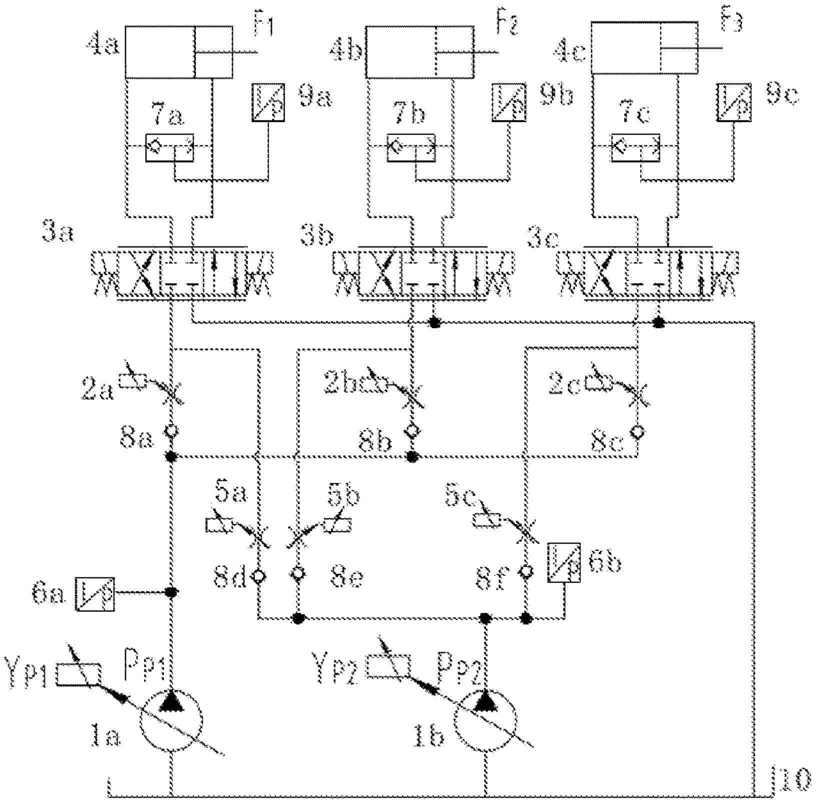
FIG. 14 is a block diagram of implementation of a substituting flow distribution control system according to an exemplary embodiment of this application.

FIG. 14 is a block diagram of implementation of a substituting flow distribution control system according to an exemplary embodiment of this application.

Reference numerals of the various elements in FIG. 4 are: electric control pressure pump 1*a* and 1*b;* main throttle valve 2*a,* 2*b* and 2*c;* load directional control valve 3*a,* 3*b* and 3*c;* executor 4*a,* 4*b* and 4*c;* flow supplementing valve 5*a,* 5*b* and 5*c;* pump outlet pressure sensor 6*a* and 6*b*; shuttle valve 7*a,* 7*b* and 7*c;* one-way valve 8*a,* 8*b,* 8*c,* 8*d,* 8*e* and 8*f;* pressure sensor9*a,* 9*b* and 9*c*; and oil tank 10.

As shown in FIG. 14, the substituting flow distribution control system solution may be used for the shuttle valve replacing the pressure sensors. As shown in FIG. 14, the shuttle valves are connected to two ends of the executors, a pressure of each working plate may also be obtained, a branch with a high pressure may be obtained through the control unit, and thus an opening degree of the flow supplementing valve is controlled for supplementing oil.

According to one or more embodiments of this application, the shuttle valves can recognize a pressure of a working oil opening of each load, the pressure sensors can obtain values of the two or more shuttle valves, so that the controller or the flow distribution solution of this application can select a loop with a large pressure for flow compensation.

According to one or more embodiments of this application, the flow distribution control system is not limited to using the variable displacement pump, and the variable displacement pump may be replaced with the constant displacement pump, which may also meet an original system characteristic. Two pumps may also be reduced to one for supplying oil for the entire system.

According to one or more embodiments of this application, the flow distribution control system or the hydraulic system of this application may integrate a directional valve and the proportional throttle valve into a proportional directional valve, and by controlling the main proportional directional valve and the auxiliary proportional directional valve, flow distribution may also be implemented.

This control solution is not limited to application of the shuttle valves, and in addition to the shuttle valves, the pressure sensors may replace the shuttle valves. In the substituting flow distribution control system, according to an exemplary embodiment of this application in FIG. 15, the shuttle valves are replaced with the plurality of pressure sensors, namely, the pressure sensor is connected in each loop in series, the functions of the present disclosure may be also implemented, the branch with the high pressure is selected through the control unit, and an instruction signal of the corresponding auxiliary valve is given.

Figure 15:
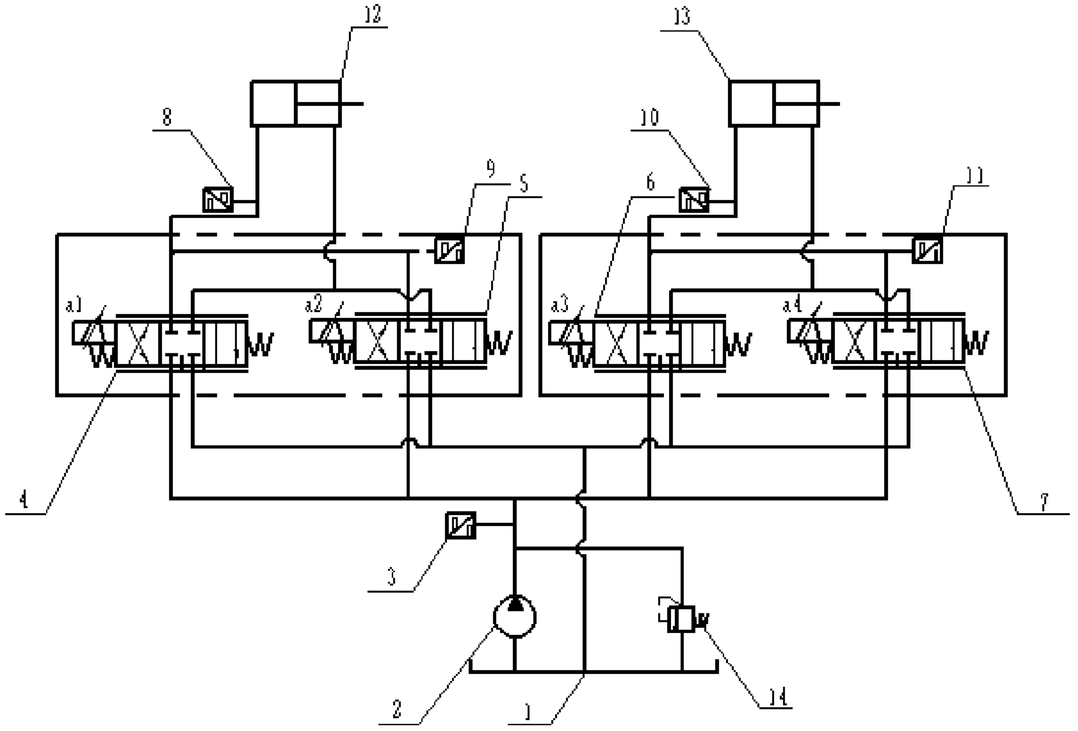
FIG. 15 is a block diagram of implementation of a substituting flow distribution control system according to an exemplary embodiment of this application.

Reference numerals of the various elements in FIG. 15 are: oil tank 1; constant displacement pump 2; pressure sensors 3, 8, 9 and 11, main electromagnetic proportional valves 4 and 6, auxiliary electromagnetic proportional valves 5 and 7, shuttle valves 8 and 10, and oil cylinders 12 and 13.

According to one or more embodiments of this application, the flow distribution control system of this application is not limited to a structure shown in FIG. 10. In FIG. 10, there are two electromagnetic proportional valves, which may be replaced with a valve block composed of the two electromagnetic proportional valves and the shuttle valves shown in FIG. 16, and a difference between FIG. 10 and FIG. 16 lies in whether the shuttle valves are included in the valve block (see reference numerals 8 and 9 in Figure).

Figure 16:
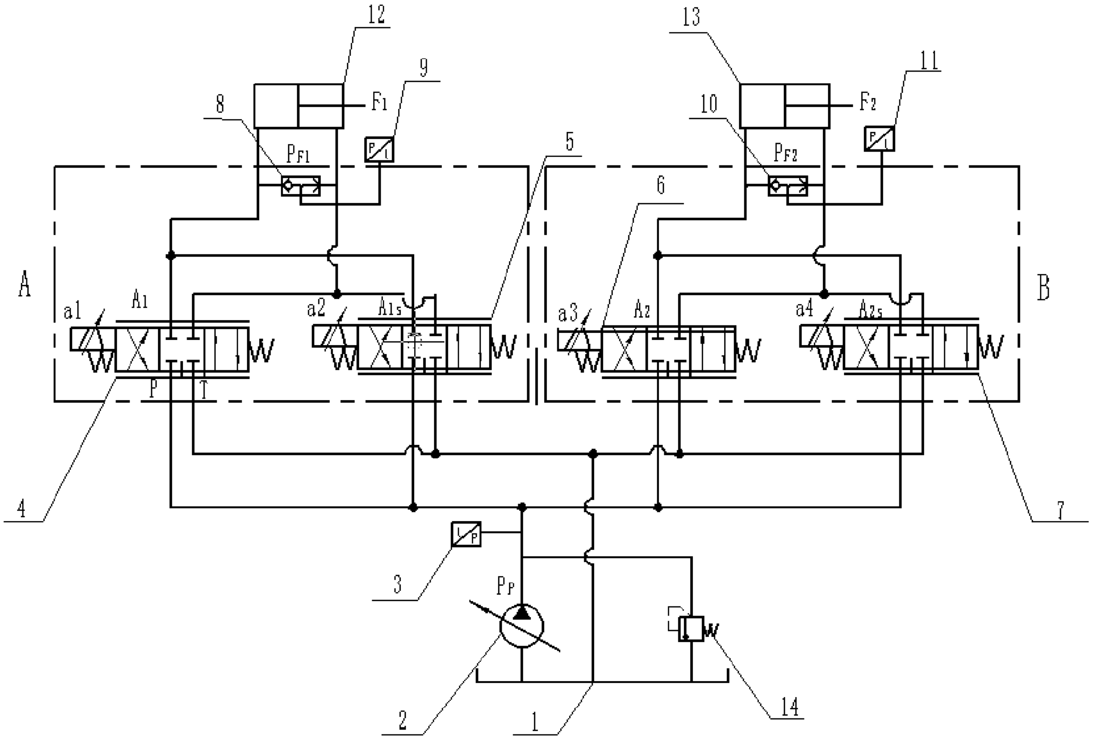
FIG. 16 is a block diagram of implementation of a substituting flow distribution control system according to an exemplary embodiment of this application.

Reference numerals of the various elements in FIG. 16 are: oil tank 1, variable displacement pump 2, pressure sensors 3, 8, 9 and 11, main electromagnetic proportional valves 4 and 6, auxiliary electromagnetic proportional valves 5 and 7, shuttle valves 8 and 10, and oil cylinders 12 and 13.

Figure 17:
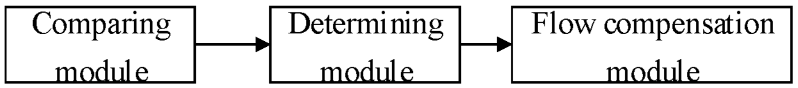
FIG. 17 is a block diagram of a flow control device for a hydraulic system according to an exemplary embodiment of this application.

FIG. 17 is a block diagram of a flow control device for a hydraulic system according to an exemplary embodiment of this application.

As shown in FIG. 17, the flow distribution control device for the hydraulic system includes: a comparing module, configured to compare pressures P1-PN at an inlet of an actuator in each loop of the hydraulic system; a determining module, configured to, according to a comparison result, determine a loop Lp1 which requires flow compensation; and a flow compensation module, configured to conduct flow compensation on the loop Lp1 according to a theoretical flow of the loop Lp1 and an actual flow in the loop Lp1 which flows into the actuator, wherein the hydraulic system includes N parallel loops L1-LN, and the number of loops in the loop Lp1 is less than or equal to N. (For example, in the above figures of this application, the loops with the multiple loads, or the loops with the plurality of actuators).

Figure 18:
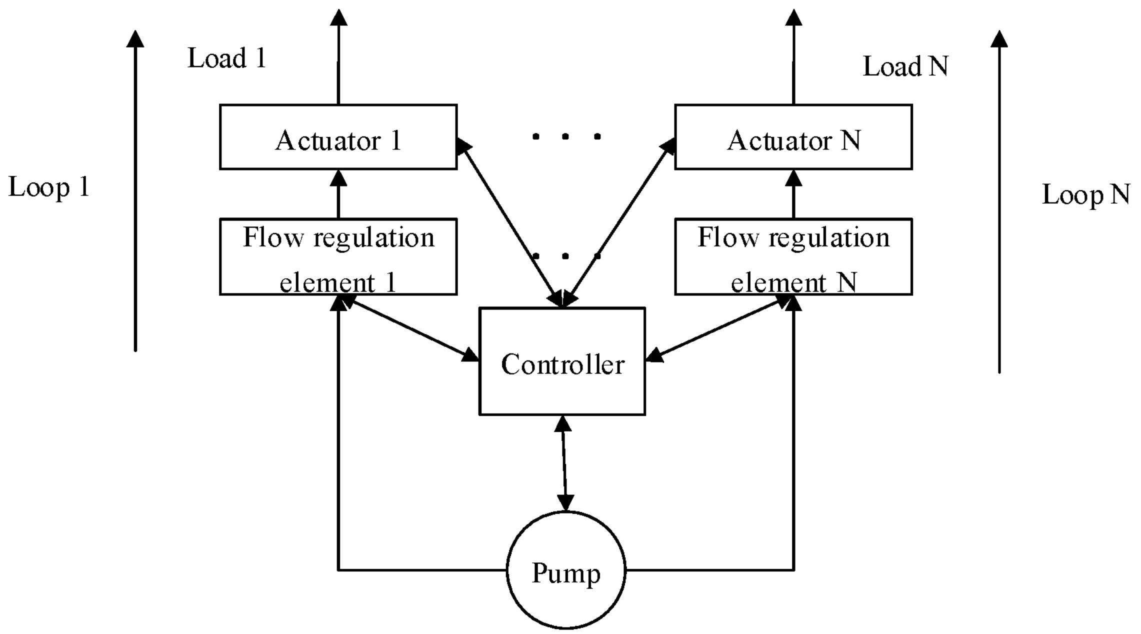
FIG. 18 is a block diagram of a hydraulic system according to an exemplary embodiment of this application.

FIG. 18 is a block diagram of a hydraulic system according to an exemplary embodiment of this application.

As shown in FIG. 18, the hydraulic system includes: a pump for providing a flow for the system; and N loops L1-LN, wherein each loop includes an actuator and a flow regulation element connected with the actuator, and the flow regulation element is configured to provide a flow for the actuator. The hydraulic system further includes a controller, the controller is connected with the pump and the flow regulation element, and the controller is configured to: compare pressures P1-PN at an inlet of an actuator in each loop of the hydraulic system; according to a comparison result, determine a loop Lp1 which requires flow compensation; and conduct flow compensation on the loop Lp1 according to a theoretical flow of the loop Lp1 and an actual flow in the loop Lp1 which flows into the actuator, wherein the number of loops in the loop Lp1 is less than or equal to N.

This application further provides a non-transitory computer-readable storage medium, storing program instructions, and one or more processors are configured to, when executing the program instructions, implement the method or a flow in each embodiment of this application as described above.

According to one or more embodiments of this application, this application further provides a hydraulic system, including the flow distribution control system, the flow distribution control device and the flow distribution control apparatus of the examples of this application, having the above non-transitory computer-readable storage medium of this application, or adopting the flow distribution control method of this application.

According to one or more embodiments of this application, the controller or a control apparatus of this application may use coding instructions (for example, computer and/or machine readable instructions) stored on the non-transitory computer and/or machine readable medium (for example, a hard disk drive, a flash memory, a read-only memory, an optical disc, a digital versatile disc, a high-speed cache, a random access memory and/or any other storage device or a storage disk) to implement processing of the above control method of this application, and information in any period of time (for example, an extended period of time, permanent, a temporary instance, temporary cache and/or information high-speed cache). As used herein, a term "non-transitory computer-readable medium" is clearly defined including any type of computer-readable storage device and/or storage disc, without a propagation signal and a transmission medium.

According to one or more embodiments of this application, a control device, a control apparatus, a master control system or a control module of this application may include one or more processors or internally include the non-transitory computer-readable medium. Specifically, the control device (the master control system or the control module) of flow distribution may include a micro control unit (MCU), arranged in a hydraulic system and configured to implement various operations of flow distribution control and implement various functions. A processor in the control device may be but is not limited to one or more single-core processors or multi-core processors. (One or more) processors may include any combination of a general-purpose processor and a special-purpose processor (for example, a graphics processor and an application processor). The processor may be coupled with and/or include a memory/storage apparatus, and may be configured to execute instructions stored in the memory/storage apparatus, so as to implement various applications and/or operating systems running on the controller in this application.

A solution for implementing flow distribution control through flow compensation in the hydraulic system provided by this application has the advantages as follows.

(1) the electric control pressure pump 1*a* supplies oil for the main throttle valves, the electric control pressure pump 1*b* supplies oil for the flow supplementing valves, a dynamic balance (namely, the compensation flow is zero) between the theoretical flow and the actual flow is implemented through closed-loop control, and thus flow distribution between different working plates is implemented to meet demands.

(2) Under a working condition of PF1>PF2>PF3, the flow distribution control method, working procedures and a flowchart. Under the working condition that PF1, PF2 and PF3 do not meet PF1>PF2>PF3, it may also refer to the above control method.

(3) The flow distribution system adopts the electric control pressure pumps, $P_{P1}-P_{F\ max}=\Delta P_1$, $P_{P2}-P_{F\ max}=\Delta P_2$, $\Delta P_1$ and $\Delta P_2$ may be regulated respectively independently, and different values may be set according to application working conditions.

(4) Loop theory (or assumption) overflow areas Aa, Ab and Ac are input parameters, which are set according to demands of actual working conditions (may be given according to a speed demand), and for convenient analysis, several other parameters ($\Delta P_1$, ρ and Cd), once set, may be constant values in default.

(5) Compared with a conventional load sensing pump, the system and the control method of this application save more energy, and are higher in response speed and easy to electrically control.

(6) The main valves and the auxiliary valves cooperate for working, the main valves obtain an initial flow demand through displacement of the handle and the flow areas of the valve spools, the auxiliary valves act when the load changes, flow compensation is implemented, namely, the main valves and the auxiliary valves work at the same time to meet the flow demand; and in an electric control unit, arithmetical operation is performed through the high-pressure branch and a pump outlet pressure difference, and the electric signal is used for transferring so as to improve a control speed and a control accuracy.

EXAMPLES OF THIS APPLICATION ARE AS FOLLOWS

A First Group of Examples

Example 1: A flow distribution control system, including: a pump configured to provide a flow for the system; N loops, wherein each loop includes a main throttle valve, a flow supplementing valve and an executor connected with the main throttle valve and the flow supplementing valve, and the pump provides a flow for each loop; and a controller connected with the pump and each loop, wherein the controller distributes the flow passing through the main throttle valve and the flow supplementing valve of each loop according to a control algorithm, and N is greater than or equal to 2.

Example 2: the system according to Example 1, wherein each loop further includes a load directional control valve configured to control a load movement direction, and an input end of the load directional control valve is connected with output ends of the main throttle valve and the flow supplementing valve, an output end of the load directional control valve is connected with the executor, and the controller is connected with the load directional control valve.

Example 3: the system according to Example 1, wherein the main throttle valve and the flow supplementing valve in each loop are connected in parallel.

Example 4: the system according to Example 1, wherein the pump at least includes a first pump and a second pump, the first pump provides the flow for the main throttle valve, and the second pump provides the flow for the flow supplementing valve.

Example 5: the system according to Example 1, further including a pressure detection element. Wherein, the pressure detection element includes: a pump outlet pressure sensor located at a pump outlet and a load pressure sensor located at output ends of the main throttle valve and the flow supplementing valve in each loop, and the pump outlet pressure sensor and the load pressure sensor send a detected pressure to the controller.

Example 6: the system according to Example 1, wherein the pump is an electric control pressure pump, a variable displacement pump or a constant displacement pump.

Example 7: the system according to Example 1, wherein in each loop, the number of main throttle valves is equal to the number of flow supplementing valves.

Example 8: the system according to Example 1, wherein the main throttle valve and the flow supplementing valve are valves in an electric proportional mode and in flow stepless regulation, or proportional directional valves.

Example 9: the system according to Example 1, wherein each loop further includes: a one-way valve located between the pump and the main throttle valve, and a one-way valve located between the pump and the flow supplementing valve.

Example 10: the system according to Example 1, wherein the controller regulates an opening degree of a valve opening of the flow supplementing valve by controlling an electric current of the flow supplementing valve.

Example 11: the system according to Example 1, further including a pressure detection element. Wherein, the pressure detection element includes: the pump outlet pressure sensor located at the pump outlet and shuttle valves located at two ends of a load in loop connection, and the pump outlet pressure sensor and the shuttle valves send an obtained pressure to the controller.

Example 12: the system according to Example 1, further including: a regulator connected with the pump, wherein a pressure and a flow of the pump are regulated according to an electric signal instruction from the controller.

A Second Group of Examples

Example 1: a flow regulation control system, including: a pump configured to provide a flow for the system; N loops, wherein each loop includes a main valve, an auxiliary valve and an executor connected with the main valve and the auxiliary valve, wherein the pump provides a flow for each loop; and a controller connected with the pump and each loop, wherein the controller controls opening degrees of valve spools of the main valve and the auxiliary valve in each loop according to a control algorithm so as to regulate an output flow of the executor, and N is greater than or equal to 2.

Example 2: the system according to Example 1, wherein the main valve controls movement of the valve spool through an inputted electric signal so as to regulate the flow, and the auxiliary valve is controlled by the controller so as to compensate insufficient flow of the executor.

Example 3: the system according to Example 1, wherein the main valve and the auxiliary valve in each loop are connected in parallel.

Example 4: the system according to Example 1, further including a pressure sensor located at an input end of the executor and a pressure sensor located at a pump outlet, wherein the pressure sensors transfer a detected pressure signal to the controller.

Example 5: the system according to Example 1, further including the pressure sensor located at the executor and configured to obtain a pressure of a load connected with the executor and select a loop with a high pressure in the system.

Example 6: the system according to Example 1, wherein in each loop, the number of main valves is equal to the number of auxiliary valves.

Example 7: the system according to Example 1, wherein the main valve and the auxiliary valve are valves in an electric proportional mode and in flow stepless regulation, or proportional directional valves.

Example 8: the system according to Example 1, further including a safety valve connected with the pump, wherein the safety valve is configured to perform safety protection for the pump.

Example 9: the system according to Example 1, wherein the controller controls a flow passing through the auxiliary valve according to change of the load connected with the executor, so as to meet a demand of the load.

Example 10: the system according to Example 1, wherein the main valve and the auxiliary valve are a valve block composed of an electromagnetic proportional valve and a shuttle valve.

Example 11: the system according to Example 1, wherein the main valve obtains an initial flow demand through displacement and a flow area of a valve spool, and when the load of the executor changes, the controller regulates a flow passing through the auxiliary valve so as to implement flow regulation control of the loop.

A Third Group of Examples

Example 1: A flow distribution control method for a hydraulic system, wherein the hydraulic system includes N loops L1-LN, and the method includes: S1: pressures P1-PN at an inlet of an actuator in each loop of the hydraulic system are compared; S2: according to a comparison result, a loop Lp1 which requires flow compensation is determined; and S3: flow compensation is conducted on the loop Lp1 according to a theoretical flow of the loop Lp1 and an actual flow in the loop Lp1 which flows into the actuator, wherein the number of loops in the loop Lp1 is less than or equal to N.

Example 2: the method according to Example 1, wherein a minimum value P min of the pressures P1-PN at the inlet of the actuator is determined, P min corresponds to a loop Lp2. And, the loop Lp1 which requires the flow compensation is: another loop in the loops L1-LN except the loop Lp2.

Example 3: the method according to Example 1 or 2, wherein the N loops L1-LN are connected in parallel, each loop includes the actuator and a main throttle valve and a flow supplementing valve which are connected with the actuator, the main throttle valve and the flow supplementing valve are connected in parallel, N is greater than or equal to 2. And, step S2 includes: the flow supplementing valve connected with the actuator of the loop Lp2 is closed.

Example 4: the method according to Example 1, wherein in step S3, according to a difference between the theoretical flow of the loop Lp1 and the actual flow in the loop Lp1 which flows into the actuator, flow compensation control is performed on the loop Lp1 by regulating a flow of the flow supplementing valve in the loop Lp1.

Example 5: the method according to Example 4, wherein step S3 includes: flow compensation control is performed by regulating the flow of the flow supplementing valve in the loop Lp1 which requires the flow compensation.

Example 6: the method according to Example 1, wherein step S3 includes: when the difference between the theoretical flow of the loop Lp1 and the actual flow in the loop Lp1 which flows into the actuator is less than or equal to zero, the flow compensation for the loop Lp1 is finished.

Example 7: the method according to Example 3, wherein the actual flow in the loop Lp1 which flows into the actuator is: a sum of the flow flowing through the main throttle valve in the loop Lp1 and the flow flowing through the flow supplementing valve in the loop Lp1.

Example 8: the method according to Example 1, wherein the theoretical flow of the loop Lp1 is set according to different working conditions, and the working conditions at least include a pressure difference and an overflow area; and the theoretical flow of the loop Lp1 is associated with a difference between a pressure at a pump outlet in the hydraulic system and a maximum pressure of the loop, a hydraulic oil liquid density, an overflow coefficient and an overflow area of the loop Lp1.

Example 9: the method according to Example 8, wherein the theoretical flow of the loop Lp1 is associated with the difference between the pressure at the pump outlet in the hydraulic system and the maximum pressure of the loop, the hydraulic oil liquid density, the overflow coefficient and the overflow area of the loop Lp1.

Example 10: the method according to Example 9, wherein the overflow area of the loop is associated with a requirement of a working condition of the hydraulic system.

Example 11: the method according to Example 1, wherein the hydraulic system includes two parallel loops, each loop includes an actuator and a main valve and an auxiliary valve which are connected with the actuator. Wherein, step S2 includes: the auxiliary valve in each loop is closed when pressures at inlets of the actuators in the two loops are equal; and a loop with a higher pressure is selected as a loop for flow compensation when the pressures at the inlets of the actuators in the two loops are unequal.

Example 12: the method according to Example 11, wherein step S3 includes: when a difference between a theoretical flow of the loop with the higher pressure and an actual flow in this loop which flows into the actuator is greater than zero, the auxiliary valve of the loop with the higher pressure opens and the auxiliary valve of another loop is closed; and when the difference between the theoretical flow of the loop with the higher pressure and the actual flow in this loop which flows into the actuator is less than or equal to zero, the flow compensation for the loop with the higher pressure is finished.

Example 13: the method according to Example 11, wherein step S2 further includes: according to a pressure sensor in the hydraulic system, the loop with the higher pressure is selected as a loop for the flow compensation.

Example 14: the method according to Example 11, wherein the main valve and the auxiliary valve in the loop are connected in parallel.

Example 15: the method according to Example 3, wherein the hydraulic system includes a pump configured to provide a flow for the system, the pump at least includes a first pump and a second pump, the first pump provides the flow for the main throttle valve, and the second pump provides the flow for the flow supplementing valve.

Example 16: the method according to Example 15, wherein a freedom degree of a flow on which the method can perform the compensation control is at most N−1; and a freedom degree of the flow or a pressure difference that the method can compensate is at most N+1.

A Fourth Group of Examples

Example 1: A flow distribution control device for a hydraulic system, wherein the hydraulic system includes N loops L1-LN, and the control device includes: a comparing module, configured to compare pressures P1-PN at an inlet of an actuator in each loop of the hydraulic system; a determining module, configured to, according to a comparison result, determine a loop Lp1 which requires flow compensation; and a flow compensation module, configured to conduct flow compensation on the loop Lp1 according to a theoretical flow of the loop Lp1 and an actual flow in the loop Lp1 which flows into the actuator, wherein the number of loops in the loop Lp1 is less than or equal to N.

Example 2: the device according to Example 1, wherein the determining module is configured to determine a minimum value P min of the pressures P1-PN at the inlet of the actuator, P min corresponds to a loop Lp2, and the loop Lp1 which requires the flow compensation is another loop in the N loops L1-LN except the loop Lp2.

Example 3: the device according to Example 1 or 2, wherein the N loops L1-LN are connected in parallel, each loop includes the actuator and a main throttle valve and a flow supplementing valve which are connected with the actuator, the main throttle valve and the flow supplementing valve are connected in parallel, N is greater than or equal to 2, and the determining module is configured to close the flow supplementing valve connected with the actuator of the loop Lp2.

Example 4: the device according to Example 1, wherein the flow compensation module is further configured to: according to a difference between the theoretical flow of the loop Lp1 and the actual flow in the loop Lp1 which flows into the actuator, perform flow compensation control on the loop Lp1 by regulating a flow of the flow supplementing valve in the loop Lp1.

Example 5: the device according to Example 1, wherein the flow compensation module is further configured to: perform flow compensation control by regulating the flow of the flow supplementing valve in the loop Lp1 which requires the flow compensation.

Example 6: the device according to Example 1, wherein the flow compensation module is further configured to: when the difference between the theoretical flow of the loop Lp1 and the actual flow in the loop Lp1 which flows into the actuator is less than or equal to zero, finish the flow compensation for the loop Lp1.

Example 7: the device according to Example 3, wherein the actual flow in the loop Lp1 which flows into the actuator is: a sum of the flow flowing through the main throttle valve in the loop Lp1 and the flow flowing through the flow supplementing valve in the loop Lp1.

Example 8: the device according to Example 1, wherein the theoretical flow of the loop Lp1 is set according to different working conditions, and the working conditions at least include a pressure difference and an overflow area.

Example 9: the device according to Example 1, wherein the theoretical flow of the loop Lp1 is associated with a difference between a pressure at a pump outlet in the hydraulic system and a maximum pressure of the loop, a hydraulic oil liquid density, an overflow coefficient and an overflow area of the loop Lp1.

Example 10: the device according to Example 9, wherein the overflow area of the loop Lp1 is associated with a requirement of a working condition of the hydraulic system.

Example 11: the device according to Example 1, wherein the hydraulic system includes two parallel loops, each loop includes an actuator and a main valve and an auxiliary valve which are connected with the actuator. Wherein, the determining module is configured to: close the auxiliary valve in each loop when pressures at inlets of the actuators in the two loops are equal; and select a loop with a higher pressure as a loop for flow compensation when the pressures at the inlets of the actuators in the two loops are unequal.

Example 12: the device according to Example 11, wherein the flow compensation module is configured to: open the auxiliary valve of the loop with the higher pressure and close the auxiliary valve of another loop when a difference between a theoretical flow of the loop with the higher pressure and an actual flow in this loop which flows into the actuator is greater than zero; and finish the flow compensation for the loop with the higher pressure when the difference between the theoretical flow of the loop with the higher pressure and the actual flow in this loop which flows into the actuator is less than or equal to zero.

Example 13: the device according to Example 11, wherein the determining module is configured to: select the loop with the higher pressure as a loop for the flow compensation according to a pressure sensor valve in the hydraulic system.

Example 14: the device according to Example 11, wherein the main valve and the auxiliary valve in the loop are connected in parallel.

Example 15: the device according to Example 3, wherein the hydraulic system includes a pump configured to provide a flow for the hydraulic system, the pump at least includes a first pump and a second pump, the first pump provides the flow for the main throttle valve, and the second pump provides the flow for the flow supplementing valve.

Example 16: the device according to Example 15, wherein a freedom degree of a flow on which the device can perform the compensation control is at most N−1; and a freedom degree of the flow or a pressure difference that the device can compensate is at most N+1.

A Fifth Group of Examples

Example 1: A flow distribution control apparatus for a hydraulic system, wherein the hydraulic system includes N loops L1-LN, the apparatus includes one or more processors and a non-transitory computer-readable storage medium storing program instructions, and the one or more processors are configured to, when executing the program instructions, implement the method according to any one of examples 1 to 16 in the third group.

A Sixth Group of Examples

Example 1: a non-transitory computer-readable storage medium, storing program instructions, wherein one or more processors are configured to, when executing the program instructions, implement the method according to any one of examples 1 to 16 in the third group.

A Seventh Group of Examples

Example 1: A hydraulic system, including: a pump for providing a flow for the system, wherein N loops L1-LN, wherein each loop includes an actuator and a flow regulation element connected with the actuator, and the flow regulation element is configured to provide a flow for the actuator. And, the hydraulic system further includes a controller, the controller is connected with the pump and the flow regulation element, and the controller is configured to: compare pressures P1-PN at an inlet of an actuator in each loop of the hydraulic system; according to a comparison result, determine a loop Lp1 which requires flow compensation; and conduct flow compensation on the loop Lp1 according to a theoretical flow of the loop Lp1 and an actual flow in the loop Lp1 which flows into the actuator, wherein the number of loops in the loop Lp1 is less than or equal to N.

Example 2: the hydraulic system according to Example 1, wherein the flow regulation element includes a main throttle valve and a flow supplementing valve.

Example 3: the hydraulic system according to Example 2, wherein the main throttle valve and the flow supplementing valve are connected in parallel.

Example 4: the hydraulic system according to Example 1, wherein the flow regulation element includes a main valve and an auxiliary valve.

Example 5: the hydraulic system according to Example 4, wherein the main valve and the auxiliary valve are connected in parallel.

Example 6: the hydraulic system according to Example 1, wherein the controller is further configured to: determine a minimum value P min of the pressures P1-PN at the inlet of the actuator, wherein P min corresponds to a loop Lp2, and the loop Lp1 which requires the flow compensation is another loop in the loops L1-LN except the loop Lp2.

Example 7: the hydraulic system according to Example 1 or 6, wherein the N loops L1-LN are connected in parallel, each loop includes the actuator and a main throttle valve and a flow supplementing valve which are connected with the actuator, the main throttle valve and the flow supplementing valve are connected in parallel, N is greater than or equal to 2. And, the controller is further configured to: close the flow supplementing valve connected with the actuator of the loop Lp2.

Example 8: the hydraulic system according to Example 1, wherein the controller is further configured to perform flow compensation control on the loop Lp1 which requires the flow compensation according to a difference between a theoretical flow of the loop Lp1 and an actual flow in the loop Lp1 which flows into an executor.

Example 9: the hydraulic system according to Example 7, wherein the controller is further configured to: perform flow compensation by regulating the flow of the flow supplementing valve in the loop Lp1 which requires the flow compensation.

Example 10: the hydraulic system according to Example 1, wherein the controller is further configured to: finish the flow compensation for the loop Lp1 when the difference between the theoretical flow of the loop Lp1 and the actual flow in the loop Lp1 which flows into the actuator is less than or equal to zero.

Example 11: the hydraulic system according to Example 3, wherein the actual flow in the loop which flows into the executor is: a sum of a flow flowing through the main throttle valve in the loop Lp1 and a flow flowing through the flow supplementing valve in the loop Lp1.

Example 12: the hydraulic system according to Example 1, wherein the theoretical flow of the loop Lp1 is set according to different working conditions, and the working conditions at least include a pressure difference and an overflow area.

Example 13: the hydraulic system according to Example 12, wherein the theoretical flow of the loop Lp1 is associated with a difference between a pressure at a pump outlet in the hydraulic system and a maximum pressure of the loop, a hydraulic oil liquid density, an overflow coefficient and an overflow area of the loop Lp1.

Example 14: the hydraulic system according to Example 13, wherein the overflow area of the loop Lp1 is associated with a requirement of a working condition of the hydraulic system.

Example 15: the hydraulic system according to Example 1, including two parallel loops, wherein each loop includes an actuator and a main valve and an auxiliary valve which are connected with the actuator. And, the controller is further configured to: close the auxiliary valve in each loop when pressures at inlets of the actuators in the two loops are equal; and select a loop with a higher pressure as a loop for flow compensation when the pressures at the inlets of the actuators in the two loops are unequal.

Example 16: the hydraulic system according to Example 15, wherein the controller is further configured to: open the auxiliary valve of the loop with the higher pressure and close the auxiliary valve of another loop when a difference between a theoretical flow of the loop with the higher pressure and an actual flow in this loop which flows into the actuator is greater than zero; and finish the flow compensation for the loop with the higher pressure when the difference between the theoretical flow of the loop with the higher pressure and the actual flow in this loop which flows into the actuator is less than or equal to zero.

Example 17: the hydraulic system according to Example 15, wherein the controller is further configured to: select the loop with the higher pressure as a loop for the flow compensation according to a pressure sensor in the hydraulic system.

Example 18: the hydraulic system according to Example 3, wherein the pump at least includes a first pump and a second pump, the first pump provides a flow for the main throttle valve, and the second pump provides a flow for the flow supplementing valve.

Example 19: the hydraulic system according to Example 18, wherein a freedom degree of a flow on which the system can perform the compensation control is at most N−1; and a freedom degree of the flow or a pressure difference that the system can compensate is at most N+1.

Besides, this application further discloses a hydraulic system, including the flow distribution control system, the flow distribution control device and the flow distribution control apparatus of the above examples of this application, having the above non-transitory computer-readable storage medium of this application, or adopting the flow control method of this application.

The accompanying drawings involved above as the examples of this application and the detailed description of this application are used for explaining this application but not for limiting the meanings or the scope of this application described in the claims. Thus, those skilled in the art may easily make modifications from the above description. Besides, those skilled in the art may delete some components described herein without degrading the performance, or may add other components so as to improve the performance. In addition, those skilled in the art may change a sequence of steps of the method described herein according to an environment of a process or a device. Thus, the scope of this application is not supposed to be determined by the above-described embodiments but is determined by the claims and their equivalents.

Though this application is described with reference to currently feasible embodiments, but it is to be understood that this application is not limited to the disclosed embodiments, and on the contrary, various modifications and equivalent configurations falling within the spirit and scope of the appended claims are covered.

The invention claimed is:

1. A flow distribution control method for a hydraulic system, wherein the hydraulic system comprises N loops (L1-LN), wherein the N loops (L1-LN) are connected in parallel, each loop includes an actuator, a main throttle valve and a flow supplementing valve which are connected with the actuator, the main throttle valve and the flow supplementing valve are connected in parallel, and N is greater than or equal to 2, and the method comprises the following steps:

S1: comparing pressures (P1-PN) at an inlet of the actuator in each loop of the hydraulic system to determine a minimum value (Pmin), wherein the minimum value (Pmin) corresponds to one or more loops (Lp2) among the N loops (L1-LN);

S2: determining one or more loops (Lp1) of the N loops (L1-LN) which requires flow compensation, wherein the loops (Lp1) are distinct from the loops (Lp2); and S3: conducting the flow compensation on the loops (Lp1) according to a theoretical flow of the loops (Lp1) and an actual flow in the loops (Lp1) which flows into the actuator, wherein, in the step S3, according to a difference between the theoretical flow of the loops (Lp1) and the actual flow in the loops (Lp1) which flows into the actuator, flow compensation control is performed on the loops (Lp1) by regulating a flow of the flow supplementing valve in the loops (Lp1).

2. The method according to claim 1, wherein step S2 further comprises: closing athe flow supplementing valves connected with the actuators of the loops (Lp2).

3. The method according to claim 1, wherein the actual flow in the loops (Lp1) which flows into the actuator is: a sum of a flow flowing through the main throttle valve in the loops (Lp1) and a flow flowing through the flow supplementing valve in the loops (Lp1).

4. The method according to claim 1, wherein the hydraulic system comprises a pump configured to provide a flow for the hydraulic system, the pump at least comprises a first pump and a second pump, wherein the first pump provides a flow for the main throttle valve, and the second pump provides a flow for the flow supplementing valve.

5. A flow distribution control apparatus for a hydraulic system, wherein the hydraulic system comprises N loops (L1-LN), wherein the N loops (L1-LN) are connected in parallel, each loop includes an actuator, a main throttle valve and a flow supplementing valve which are connected with the actuator, the main throttle valve and the flow supplementing valve are connected in parallel, and N is greater than or equal to 2, and the apparatus comprises one or more processors and a non-transitory computer-readable storage medium storing program instructions, and when executing the program instructions, the one or more processors are configured to:

compare pressures (P1-PN) at an inlet of the actuator in each loop of the hydraulic system to determine a minimum value (Pmin), wherein the minimum value (Pmin) corresponds to one or more loops (Lp2) among the N loops (L1-LN);

determine one or more loops (Lp1) of the N loops (L1-LN) which requires flow compensation, wherein the loops (Lp1) are distinct from the loops (Lp2); and conduct the flow compensation on the loops (Lp1) according to a theoretical flow of the loops (Lp1) and an actual flow in the loops (Lp1) which flows into the actuator, wherein according to a difference between the theoretical flow of the loops (Lp1) and the actual flow in the loops (Lp1) which flows into the actuator, flow compensation control is performed on the loops (Lp1) by regulating a flow of the flow supplementing valve in the loops (Lp1).

6. A hydraulic system, comprising:

a pump configured to provide a flow for the system;

N loops (L1-LN) connected in parallel, wherein each loop comprises an actuator and a flow regulation element connected with the actuator, the flow regulation element comprises a main throttle valve and a flow supplementing valve connected in parallel, the flow regulation element is configured to provide a flow for the actuator, and N is greater than or equal to 2; and the hydraulic system further comprising a controller, wherein the controller is connected with the pump and the flow regulation element, and configured to:

compare pressures (P1-PN) at an inlet of the actuator in each loop of the hydraulic system to determine a minimum value (Pmin), wherein the minimum value (Pmin) corresponds to one or more loops (Lp2) among the N loops (L1-LN);

determine one or more loops (Lp1) of the N loops (L1-LN) which requires flow compensation, wherein the loops (Lp1) are distinct from the loops (Lp2); and conduct the flow compensation on the loops (Lp1) according to a theoretical flow of the loops (Lp1) and an actual flow in the loops (Lp1) which flows into the actuator, wherein according to a difference between the theoretical flow of the loops (Lp1) and the actual flow in the loops (Lp1) which flows into the actuator, flow compensation control is performed on the loops (Lp1) by regulating a flow of the flow supplementing valve in the loops (Lp1).

* * * * *